US011260252B2

(12) United States Patent
Blackford et al.

(10) Patent No.: US 11,260,252 B2
(45) Date of Patent: Mar. 1, 2022

(54) METHODS AND APPARATUS FOR GENERATING ENERGY USING FALL PROTECTION DEVICES

(71) Applicant: 3M INNOVATIVE PROPERTIES COMPANY, St. Paul, MN (US)

(72) Inventors: Matthew J. Blackford, Hastings, MN (US); Jia Hu, Mounds View, MN (US); Jay A. Esch, River Falls, WI (US); Ronald D. Jesme, Plymouth, MN (US); Orlin B. Knudson, Vadnais Heights, MN (US); Jonathan E. Reneberg, Indianapolis, IN (US); Jared C. Ferraro, Zionsville, IN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/340,526

(22) PCT Filed: Oct. 12, 2017

(86) PCT No.: PCT/US2017/056307
§ 371 (c)(1),
(2) Date: Apr. 9, 2019

(87) PCT Pub. No.: WO2018/071646
PCT Pub. Date: Apr. 19, 2018

(65) Prior Publication Data
US 2020/0047006 A1 Feb. 13, 2020

Related U.S. Application Data

(60) Provisional application No. 62/408,194, filed on Oct. 14, 2016.

(51) Int. Cl.
*A62B 35/00* (2006.01)
*H02J 7/32* (2006.01)
*G08B 21/02* (2006.01)

(52) U.S. Cl.
CPC ...... *A62B 35/0025* (2013.01); *A62B 35/0075* (2013.01); *H02J 7/32* (2013.01); *G08B 21/02* (2013.01)

(58) Field of Classification Search
CPC .... A62B 35/0025; A62B 35/0075; H02J 7/32; G08B 21/02
See application file for complete search history.

(56) References Cited

U.S. PATENT DOCUMENTS 6,925,967 B1 8/2005 Woodruff
8,490,751 B2 7/2013 Allington
(Continued)

FOREIGN PATENT DOCUMENTS

CN 201768282 3/2011
JP 2013-111099 6/2013
(Continued)

OTHER PUBLICATIONS

European Application EP17861118, Supplemental Search Report dated Apr. 7, 2020.
(Continued)

*Primary Examiner* — Alvin C Chin-Shue

(57) ABSTRACT

A fall protection device comprises an energy harvester to generate electrical power in response to movement of an elongate member and a circuit powered by the generated electrical power; an impact indicator connected to an elongate member, a controller connected to the elongate member and/or the impact indicator to generate a message in response to impact, and a transmitter connected to the controller to transmit the message; and/or a sensor con-
(Continued)

nected to an elongate member and a controller connected to the sensor to generate a message in response to movement of the elongate member. The fall protection device could include a generator to generate electrical power, an energy storage capacitor to store the generated electrical power, a controller powered by the energy storage capacitor to generate a message in response to action, and a wireless transmitter powered by the energy storage capacitor to transmit the message.

17 Claims, 29 Drawing Sheets

(56) References Cited

U.S. PATENT DOCUMENTS

| | | | |
|---|---|---|---|
| 2008/0157531 A1 | 7/2008 | Bulthaup | |
| 2009/0089108 A1 | 4/2009 | Angell | |
| 2010/0219016 A1 | 9/2010 | Meillet | |
| 2010/0224448 A1 | 9/2010 | Wolner | |
| 2010/0226748 A1 | 9/2010 | Wolner | |
| 2010/0231402 A1 | 9/2010 | Flynt | |
| 2010/0282541 A1 | 11/2010 | Renton | |
| 2011/0203871 A1 | 8/2011 | Faye | |
| 2014/0097285 A1 | 4/2014 | Chang | |
| 2015/0042472 A1 | 2/2015 | Muetzel | |
| 2015/0207384 A1* | 7/2015 | Panousis | H02K 7/1853 290/1 C |
| 2015/0311741 A1* | 10/2015 | Baker | H02J 50/10 320/108 |
| 2016/0029890 A1* | 2/2016 | Stump | A61B 5/0022 600/301 |
| 2016/0236017 A1 | 8/2016 | Gross | |
| 2017/0063198 A1* | 3/2017 | Spencer | H02J 7/32 |
| 2019/0290164 A1* | 9/2019 | Vasandani | A61N 1/378 |
| 2020/0242915 A1* | 7/2020 | Pham | A62B 35/04 |

FOREIGN PATENT DOCUMENTS

| | | | |
|---|---|---|---|
| KR | 2007-0072350 | 7/2007 | |
| WO | 2010-101727 | 9/2010 | |
| WO | 2010-104405 | 9/2010 | |
| WO | WO 2011-079266 | 6/2011 | |
| WO | WO-2018075437 A1 * | 4/2018 | A61B 5/08 |

OTHER PUBLICATIONS

Harnessing Ambient Energy to Detect Motion and Save Power Publitek Marketing Communications (Web Article—May 15, 2013) retrieved on internet on Jun. 7, 2019 URL: [http://www.digikey.com/en/articles/techzone/2013/may/harnessing-ambient-energy-to-detect-motion-and-save-power], 1 Page.
Jung, "Wearable fall detector using integrated sensors and energy devices", Scientific Reports, 2015, pp. 1-9.
International Search report for PCT International Application No. PCT/US2017/056307 dated Jan. 5, 2018, 2 pages.

* cited by examiner

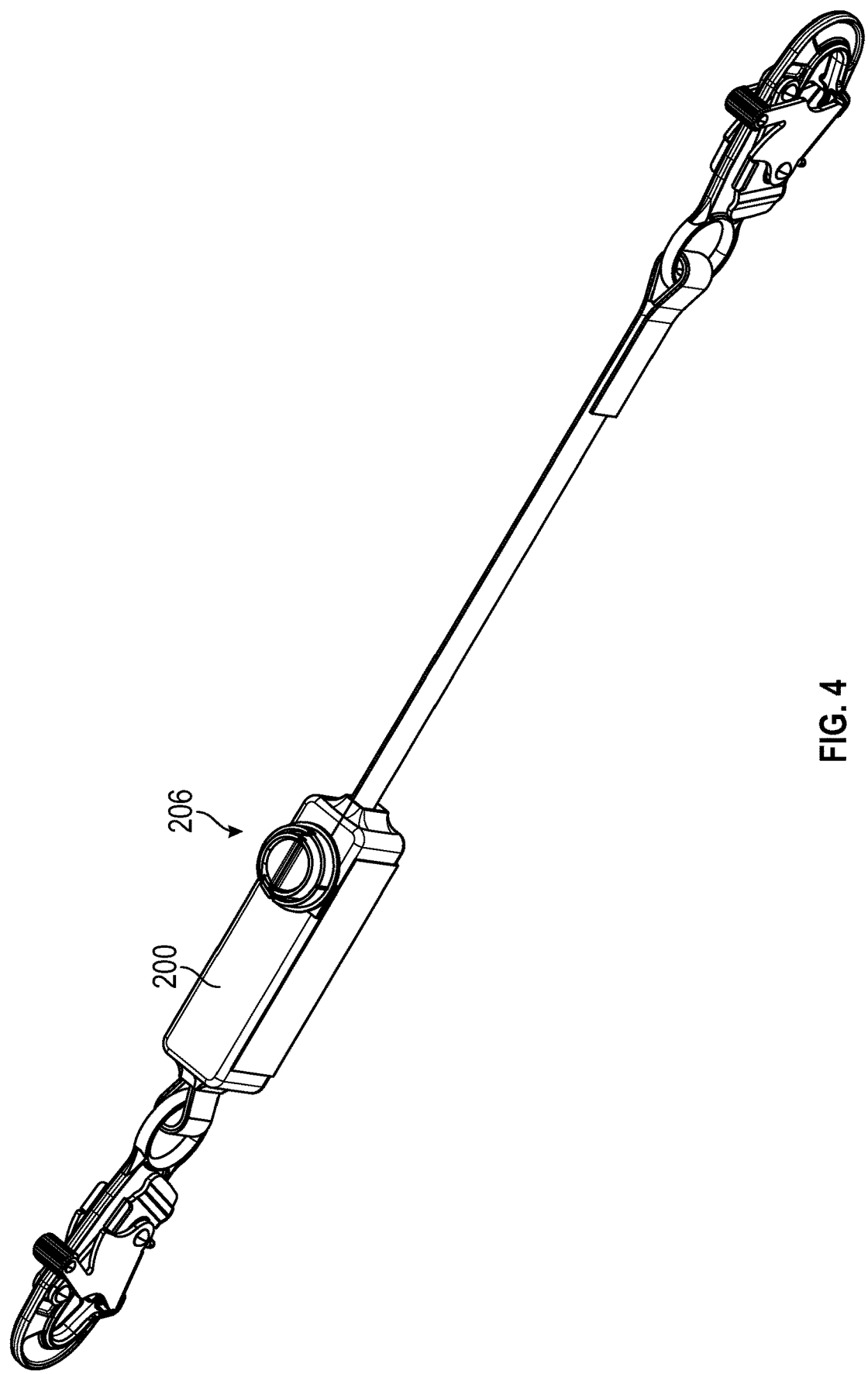

METHODS AND APPARATUS FOR GENERATING ENERGY USING FALL PROTECTION DEVICES

CROSS REFERENCE TO RELATED APPLICATIONS

This application is a national stage filing under 35 U.S.C. 371 of PCT/US2017/056307, filed Oct. 12, 2017, which claims the benefit of Provisional U.S. Application No. 62/408,194, filed Oct. 14, 2016, the disclosure of which is incorporated by reference in its/their entirety herein.

BACKGROUND OF THE INVENTION

Workers performing tasks at heights typically use a variety of fall protection devices.

For example, workers don full body safety harnesses, which are connected to support structures with devices such as lanyards, energy absorbers, self-retracting lifelines, descenders, and the like.

Should a fall occur, the worker should be rescued as quickly as possible in case the worker is injured and to prevent any injury such as suspension trauma from occurring. Currently, the worker relies heavily on his/her co-workers to alert others of his/her fall. Providing alerts quickly can be challenging if the worker is in a remote location or unable to communicate.

Therefore, there is a need for automatic, reliable alerts. There are disadvantages to using batteries for alerts. For example, batteries need to be checked for adequate charge before each use. Given the frequency of use of the fall protection equipment, this could be quite burdensome. Therefore, to assist with reliability, alerts should not rely solely on batteries or require batteries.

In addition to indicating that a fall has occurred, alerts could be used to indicate dangerous work conditions and indicate when devices should be repaired or replaced. Fall protection devices could also be monitored for usage information.

For the reasons stated above and for other reasons stated below, which will become apparent to those skilled in the art upon reading and understanding the present specification, there is a need in the art for methods and apparatus for generating energy using fall protection devices.

BRIEF SUMMARY OF THE INVENTION

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, a fall protection device comprises an elongate member for interconnecting a user and a support structure, an energy harvester to generate electrical power in response to movement of the elongate member, and a circuit powered by the generated electrical power.

In one embodiment, a fall protection device comprises a generator to generate electrical power in response to potential energy of the fall protection device being converted into kinetic energy, an energy storage capacitor to store the generated electrical power, a controller powered by the energy storage capacitor, the controller to generate a message in response to an action from use of the fall protection device, and a wireless transmitter powered by the energy storage capacitor, the wireless transmitter to transmit the message.

In one embodiment, a fall protection device comprises an elongate member for interconnecting a user and a support structure, an impact indicator connected to the elongate member, a controller connected to at least one of the elongate member and the impact indicator to generate a message in response to an impact, and a transmitter connected to the controller to transmit the message.

In one embodiment, a fall protection device comprises an elongate member for interconnecting a user and a support structure, a sensor connected to the elongate member, and a controller connected to the sensor to generate a message in response to movement of the elongate member.

BRIEF DESCRIPTION OF THE DRAWINGS

The present invention can be more easily understood, and further advantages and uses thereof can be more readily apparent, when considered in view of the detailed description and the following Figures in which:

FIG. 4 is a perspective view of a lanyard including a recoil spring;

In accordance with common practice, the various described features are not drawn to scale but are drawn to emphasize specific features relevant to the present invention. Reference characters denote like elements throughout the Figures and the text.

DETAILED DESCRIPTION OF THE INVENTION

Figure 1:
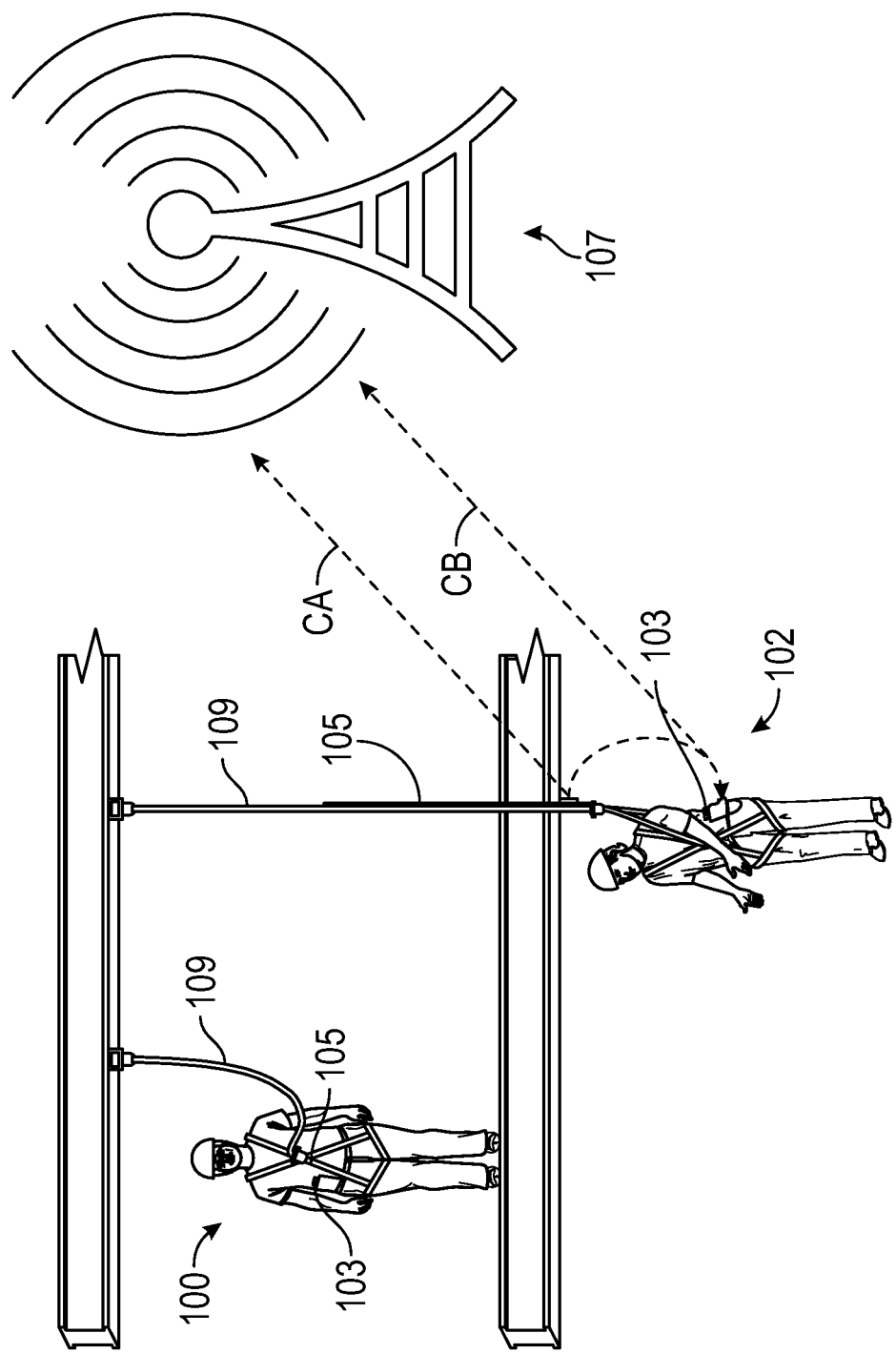
FIG. 1 illustrates a worker using an elongate member during use and after a fall.

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes or electrical changes may be made without departing from the spirit and scope of the present invention. The following detailed description is, therefore, not to be taken in a limiting sense, and the scope of the present invention is defined only by the claims and equivalents thereof.

Generally, this invention relates to methods and apparatus for generating energy using fall protection devices. Various types of energy generating devices could be used with various types of fall protection devices to generate or harvest energy. The energy could also be stored. Depending upon the type of fall protection device being used, energy could be generated during normal use of the fall protection equipment and/or during a fall event. The energy could be converted into electrical power and used to power a communication system for indicating that a fall has occurred, indicating dangerous work conditions, and indicating when devices should be repaired or replaced. Usage information could also be monitored.

An example of a fall protection device that could be used with the present invention includes one having an elongate member for interconnecting a worker and a support structure. Examples of fall protection devices including elongate members are lanyards, energy absorbers, self-retracting lifelines, and descenders. In a lanyard, such as an energy absorbing lanyard, and in an energy absorber, generally at least two portions separate to absorb energy as a worker falls. The at least two portions could be separate or integral portions. The two portions could be webbing connected with stitching that tears during separation, piece(s) of metal that are weakened (e.g., perforations or score lines) and detach during separation, or other suitable types of energy absorbing devices. The separation of the two portions causes movement or elongation, which could be used to generate energy that can be converted into electrical power. Another type of lanyard that could be used is an elastic type lanyard with partially oriented fibers that elongate during a fall so the length between connections proximate the ends of the lanyard comprises the energy absorbing component. Examples of lanyards include those available under the trade designation "EZ-STOP" shock absorbing lanyard and "SHOCK-WAVE 2" shock absorbing lanyard from 3M Company, St. Paul, Minn. Examples of energy absorbers include those commercially available under the trade designation "ZOR-BIT" energy absorber from 3M Company. In a self-retracting lifeline, the elongate member includes a lifeline wound about a biased drum rotatably connected to a housing, and as the lifeline is paid out of and retracted into the housing, movement of the lifeline causes the drum to rotate. Rotation or movement of the drum relative to the housing could be used to generate energy that can be converted into electrical power. Examples of self-retracting lifelines include those commercially available under the trade designation "ULTRA-LOK" self-retracting lifeline, "NANO-LOK" self-retracting lifeline, and the "REBEL" self-retracting lifeline from 3M Company. A descender having a lifeline wound about a drum or a pulley that rotates during descent could also be used to generate energy that can be converted into electrical power. Examples of a descender are those commercially available under the trade designation "ROLLG-LISS" descender manufactured from 3M Company. These types of fall protection devices are known in the art, and it is recognized that other suitable types of fall protection devices could be used.

In a free fall of a person, an abundance of potential energy becomes kinetic energy. Table 1 is a calculation of potential energy and kinetic energy when a person weighing 80 kilograms free falls for 2 meters, which results in 1600 Joules or an average of 5000 Watts for 0.32 seconds. This is when the initial velocity of the fall is zero.

TABLE 1

Potential Energy and Kinetic Energy Available in a Worker's Fall
Potential Energy in Free Falls
$\Delta E = m^* g^* \Delta h$
$\Delta h = 1/2° g^* \Delta t^2$

| mass (kg) | gravity (m/s$^2$) | $\Delta h$ (m) | $\Delta t$ (s) | $\Delta E$ (joul) | Power (W) | Power (mW) |
|---|---|---|---|---|---|---|
| 80 | 10 | 2 | 0.32 | 1600 | 5060 | |

Bluetooth Low Energy ("BLE") protocol needs only 17 mJ in 1.15 seconds (3.3 V and 4.5 mA). Antenna communication protocol needs 30 mJ to 100 mJ in 0.5 to a few seconds (3 V and 20 mA). Those are very small amounts of energy as compared to the amount of energy available in a fall. Thus, a communication system may be powered by energy harvested during a worker's fall.

Communication could be done through a cell phone used by a worker, a control center, or a combination thereof. As generally illustrated in FIG. 1, a worker with a cell phone 103 is shown using an elongate member 109 during normal use 100 and after a fall stops 102. The elongate member 109 is connected to an energy harvester 105 and circuit, where the energy harvester generates electrical power during elongation of the elongate member 109 during a fall. The circuit is powered by the generated electrical power and communicates directly with the control center 107, illustrated by line CA, and/or with a cell phone 103 that then communicates with the control center 107, illustrated by line CB. Communication could be directed to a cell phone through Blue Tooth technology and to a control center through an antenna. The cell phone could utilize a mobile application ("App") that could dial the control center.

Lanyards and Energy Absorbers

An energy harvester used with lanyards and energy absorbers could be electric motors reversely operated to provide generators. They could alternately or also be specialized motors or special designed generators. The terms lanyard, energy absorbing lanyard, and energy absorber are herein used interchangeably. Therefore, the use of one of these terms should not exclude any of the other terms.

Figure 2:
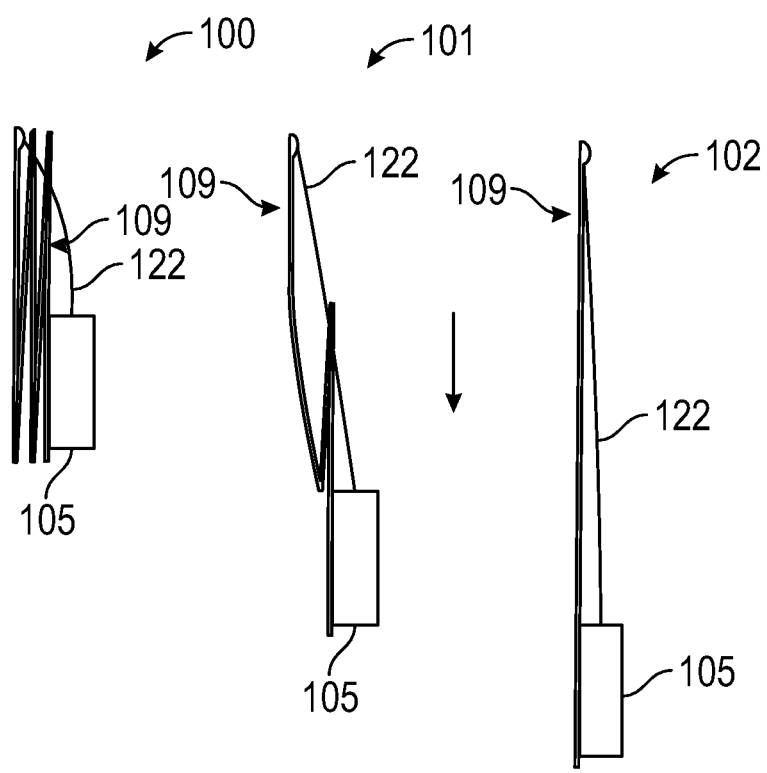
FIG. 2 is a schematic view of an elongate member transforming from a configuration during use, to a configuration during a fall, to a configuration after a fall.
Figure 3A:
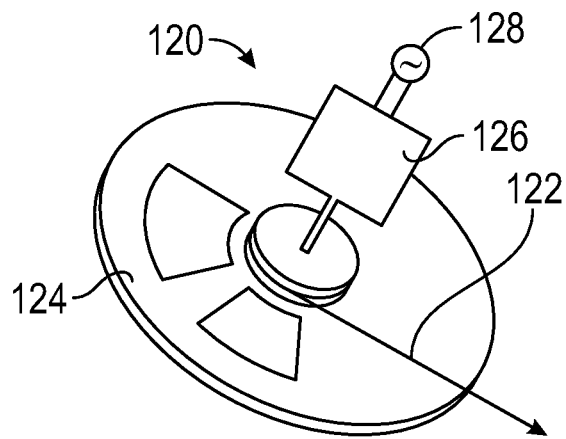
FIG. 3A is a front view of a coiled-rope generator.

As schematically illustrated in FIG. 2, and as illustrated in FIG. 3A, in some embodiments, an energy harvester is a coiled-rope generator 120 including a coiled-rope 122 that uncoils and rotates a flywheel 124 as the elongate member moves. An elongate member including an energy absorber that is folded onto itself and secured is connected to an energy harvester including a coiled-rope generator 120 (FIG. 3A) including a coiled rope 122 wound about a flywheel 124 and operably connected to energy harvester 105. The coiled-rope generator 120 and the coiled-rope 122 connect the portions of the elongate member 109 that will separate during a fall 101. During normal use 100, the coiled-rope 122 is not pulled. As the energy absorber of the elongate member 109 separates and elongates in length during a fall 101, the coiled rope 122 is pulled, which makes the flywheel 124 turn and reversely operate a motor 126 to generate electric current 128. The coiled rope 122 is pulled until the fall stops 102. The flywheel 124 may continue to rotate such that reversely operated motor 126 continues to generate electric current 128 for a time after the fall stops.

Figure 3B:
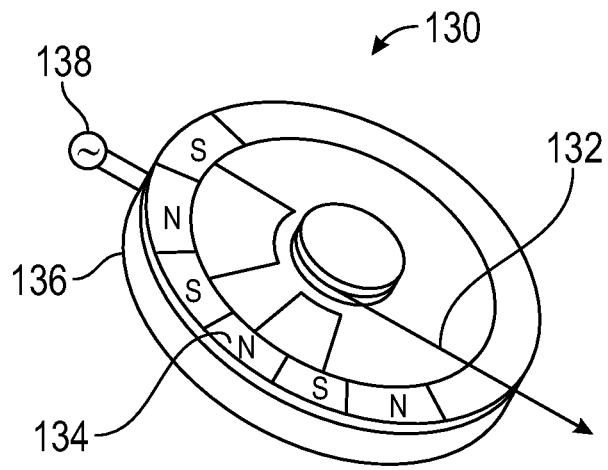
FIG. 3B is a front view of another embodiment coiled-rope generator.
Figure 3C:
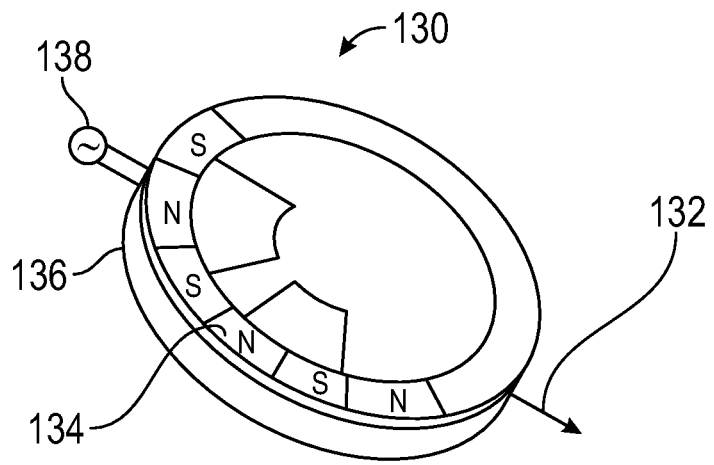
FIG. 3C is a rear view of the coiled-rope generator shown in FIG. 3B.

Alternatively to coiled-rope generator 120, a coiled-rope generator 130 (a first side is illustrated in FIG. 3B and a second side opposite to the first side is illustrated in FIG. 3C) includes a flywheel 134 about which a coiled rope 132 is wound and including magnets N and S and operable connected to energy harvester 105 to be used to generate energy during elongation of an energy absorbing lanyard 109 (not shown). For example, magnets N and S could be mounted on the flywheel 134 as a rotor and discs of wire coils 136 could be mounted on both sides of the flywheel 134 as a stator to generate electric current 138.

Figure 5A:
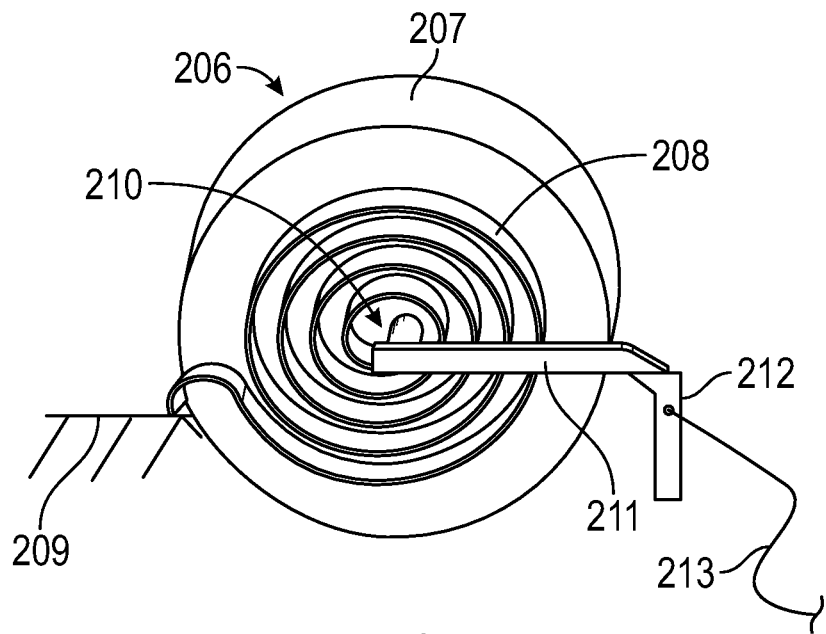
FIG. 5A illustrates a recoil spring in a connected position.
Figure 5B:
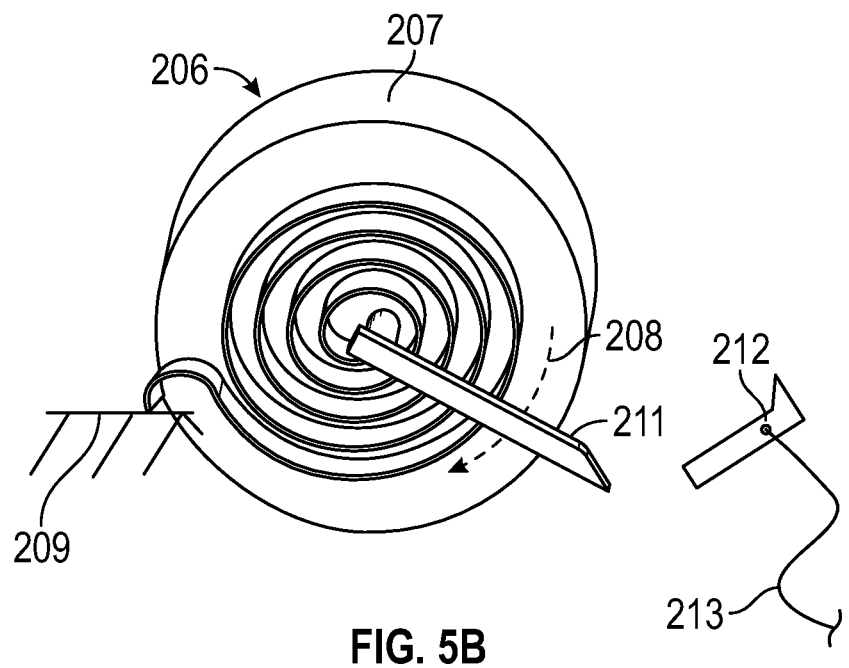
FIG. 5B illustrates the recoil spring shown in FIG. 5A in a released position.

Another example of an energy harvester 206 includes a recoil spring 208 that rotates a generator 207 as an energy absorbing lanyard 200 moves or elongates to generate electric current. This is illustrated in FIGS. 4, 5A, and 5B. The recoil spring 208 includes a first, fixed end 209, which may be fixed to the energy absorbing lanyard 200, and a second end 210, which is connected to a connecting member 211. The connecting member 211 interconnects the second end 210 and a latch member 212. The latch member 212 assists in maintaining the recoil spring's general shape during normal use and releases the recoil spring 208 in response to a fall to release stored energy in the recoil spring 208. The energy absorbing lanyard 200 moves or elongates when portions separate or the lanyard stretches during a fall, and a breaking element 213 pulls the latch member 212 from the connecting member 211. When the latch member 212 releases the connecting member 211, potential energy stored in the recoil spring 208 is released to rotate the generator 207 and generate electric current.

It is recognized that any suitable type of lanyard or energy absorber could be used and the invention is not limited to use with the type of lanyards and energy absorbers shown and described herein.

Self-Retracting Lifelines and Descenders

Different types of self-retracting lifelines and descenders could be used. For example, mechanical braking systems and eddy current braking systems could be used. Self-retracting lifelines and descenders are similar in that they both may include a rotatable member, such as a drum or a pulley about which a lifeline is wound. Therefore, these terms could be used interchangeably and use of one of these terms should not exclude the other term.

A recoil spring, similar to the recoil spring 208 used with the energy absorbing lanyard 200, could be used with a self-retracting lifeline. For example, many self-retracting lifelines utilize a motor spring to place a biasing force on the drum to automatically retract any lifeline that has been paid out when tension on the lifeline has been released. The motor spring could be used as a recoil spring, and a generator could be connected to the recoil spring whereby movement of the recoil spring generates electricity.

Movement of the lifeline (pay out and retraction) that moves or rotates the drum could also be used to generate electricity. Generally, the force to pay out a lifeline during normal use of a self-retracting lifeline ranges from 2 to 10 pounds and the line speed ranges from 4 to 5 feet per second. During a fall event, the speed at which the line is pulled to lock the drum, and thus prevent further lifeline from being paid out, is typically about 7 feet per second.

Energy used to pull a lifeline can be calculated as force times length. If one uses an example of a 3 inch (0.08 meter) diameter drum where one foot (0.3 meter) of the line is pulled in 0.25 second (4 feet per second), a calculation in Table 2 shows that it consumes 12 Joules of energy, or about 48 Watts, during the 0.25 second. Because each wireless communication requires 10 to 30 mJ, only 0.1 to 0.3% of the energy to pull the line for 1 foot is needed to power a wireless communication one time.

TABLE 2

| | Force (N) | gravity (m/s^2) | ΔL (m) | Δt (s) | Drum D (m) | ΔE (joul) | Ave. Power (W) | Speed S m/s | RPM |
|---|---|---|---|---|---|---|---|---|---|
| | | | | | Energy in Pulling a String | | | | |
| | | | | | Energy in Pulling a String Δε = p* ΔL | | | | |
| A pull | 40 | 10 | 0.3 | 0.25 | 0.08 | 12 | 48 | 1.20 | 4.8 |

The speed at which a lifeline is pulled and retracted during normal use, not during a fall event, is casual, not fast. As shown in Table 2, the linear speed is 1.2 meters per second, equivalent to 4.8 rpm. An exceptional case is when a fall occurs. During 6 feet of free fall, which is an exceptional distance, the final speed reaches about 6 meters per second. In this exceptional example, the rpm is not optimal for electromagnetic induction without a supplement such as a flywheel or a gear. The rotating speed is still less than 24 rpm. Those are not the speeds at which electromagnetic generators typically operate optimally. Therefore, optionally, storage of kinetic energy and conversion to electricity could also be used. This could be accomplished by using a mechanical retracting system using a one-way clutch that drives a flywheel to store kinetic energy or eddy current braking systems where magnets, rotating conductors, and star gears speed up rotation.

Figure 6:
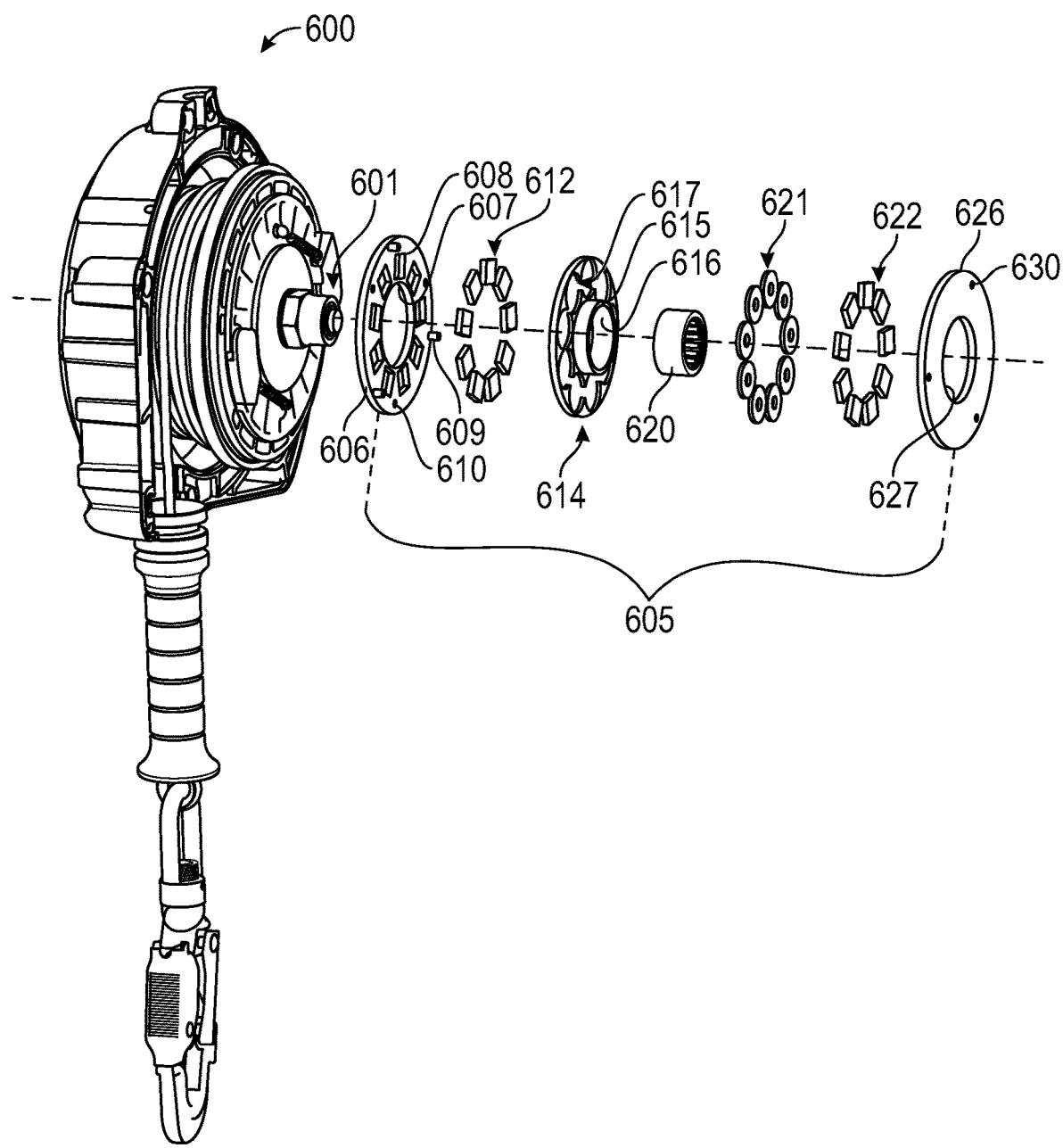
FIG. 6 is a partially exploded perspective view of a self-retracting lifeline including a flywheel assembly with a one-way clutch bearing.
Figure 6A:
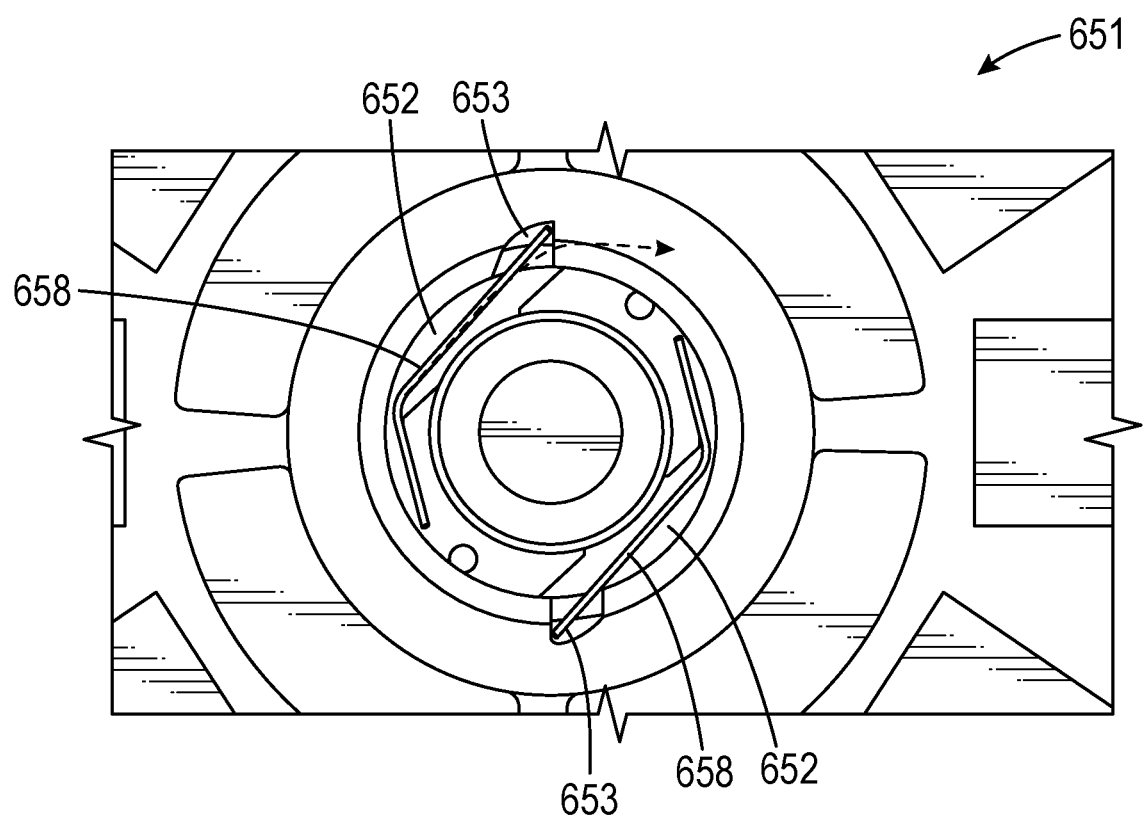
FIG. 6A illustrates spring wires that could be used with a flywheel assembly with a one-way clutch.
Figure 6B:
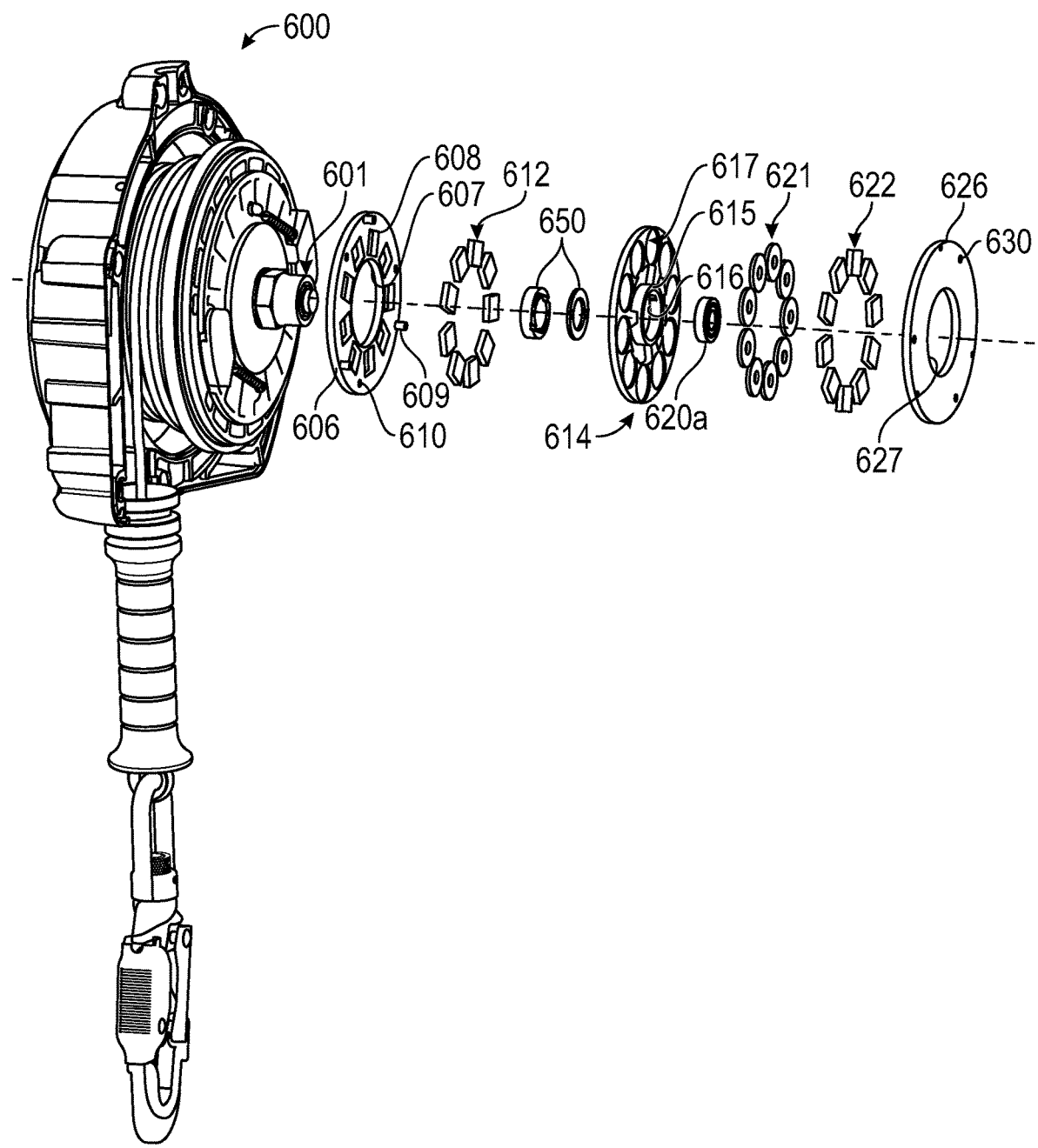
FIG. 6B is a partially exploded perspective view of a self-retracting lifeline including a flywheel assembly with a one-way clutch and spring wires.
Figure 6C:
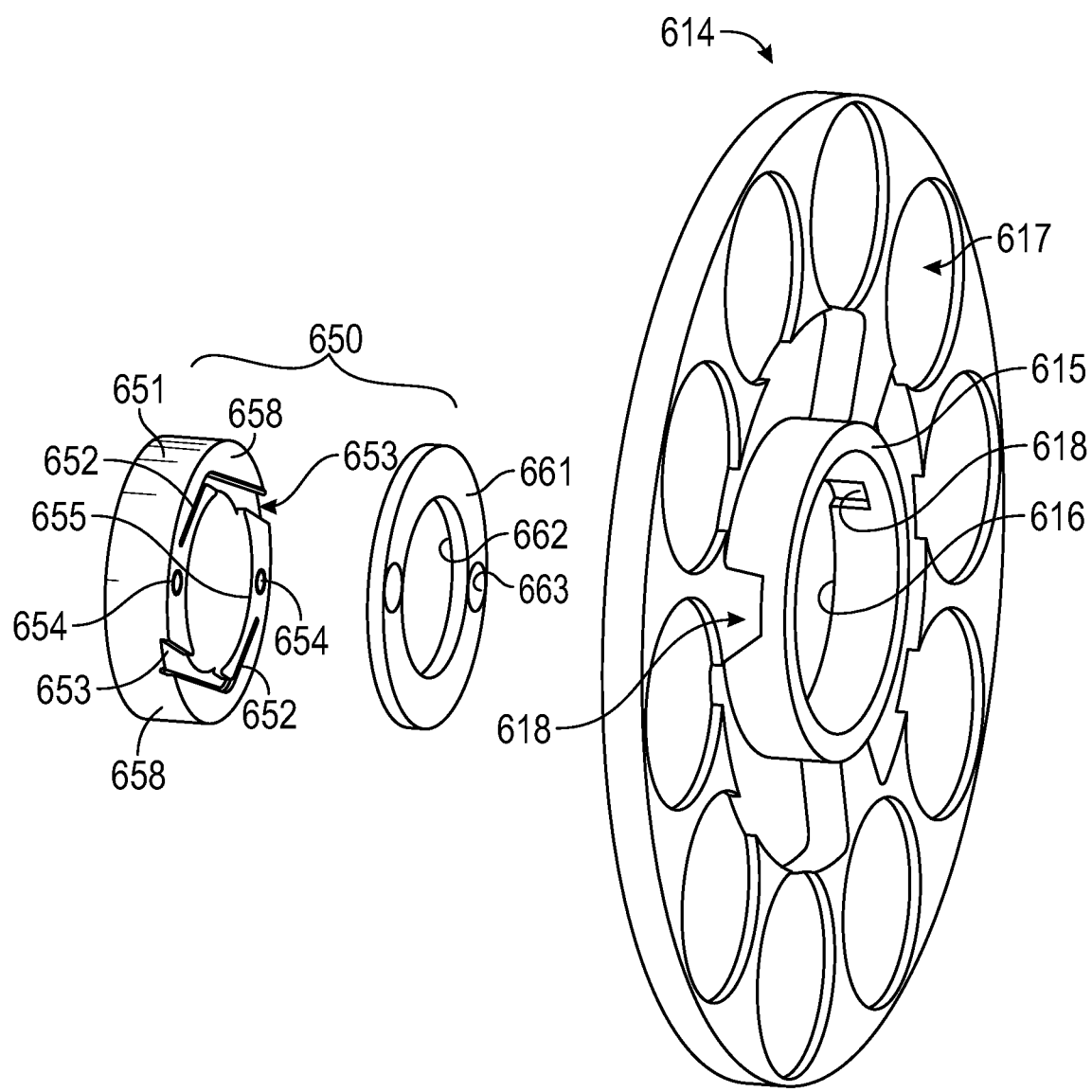
FIG. 6C is an exploded perspective view of a spring wire assembly of the self-retracting lifeline shown in FIG. 6B.
Figure 6D:
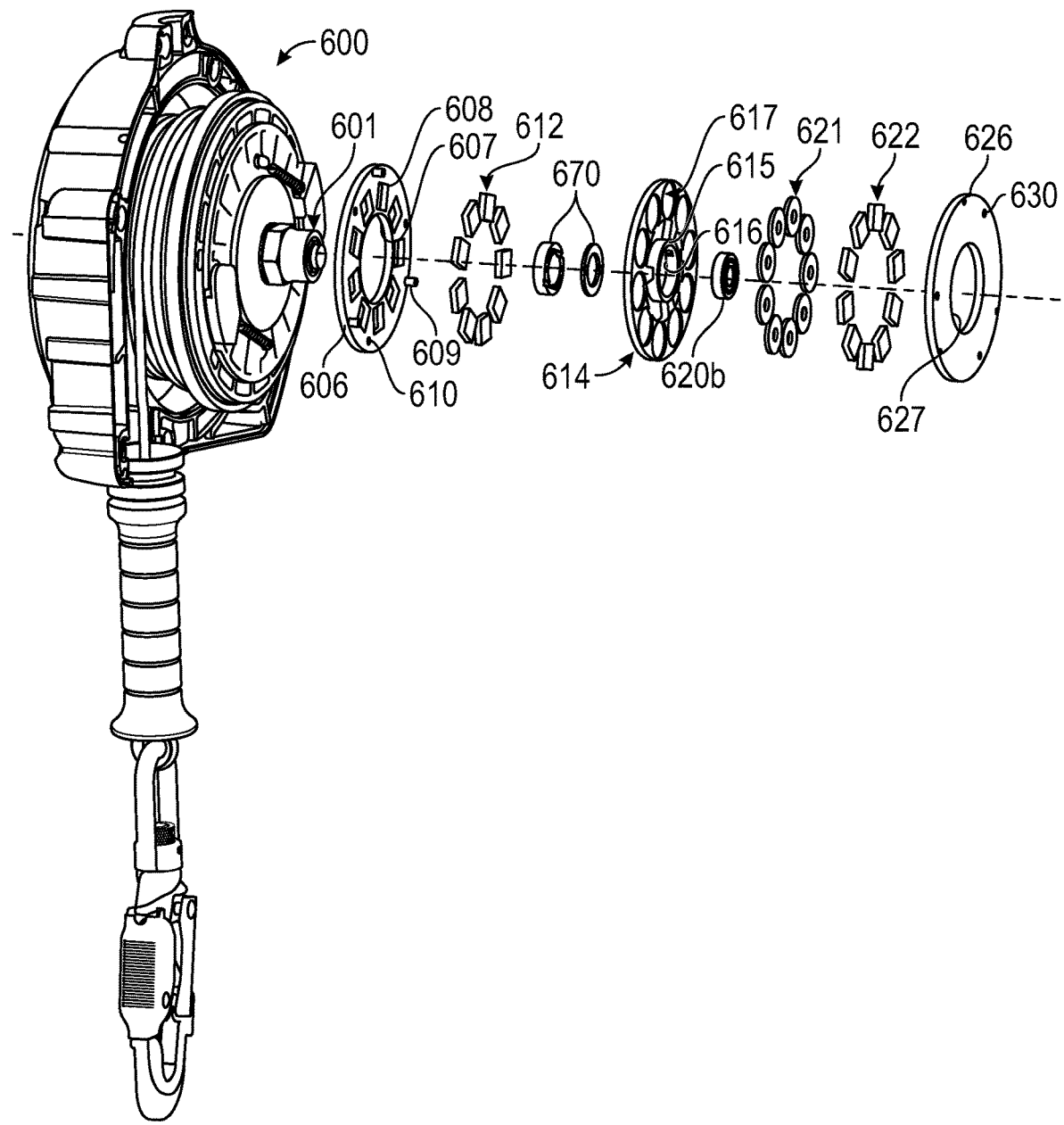
FIG. 6D is a partially exploded perspective view of another embodiment self-retracting lifeline including a flywheel assembly with a one-way clutch and spring wires.
Figure 6E:
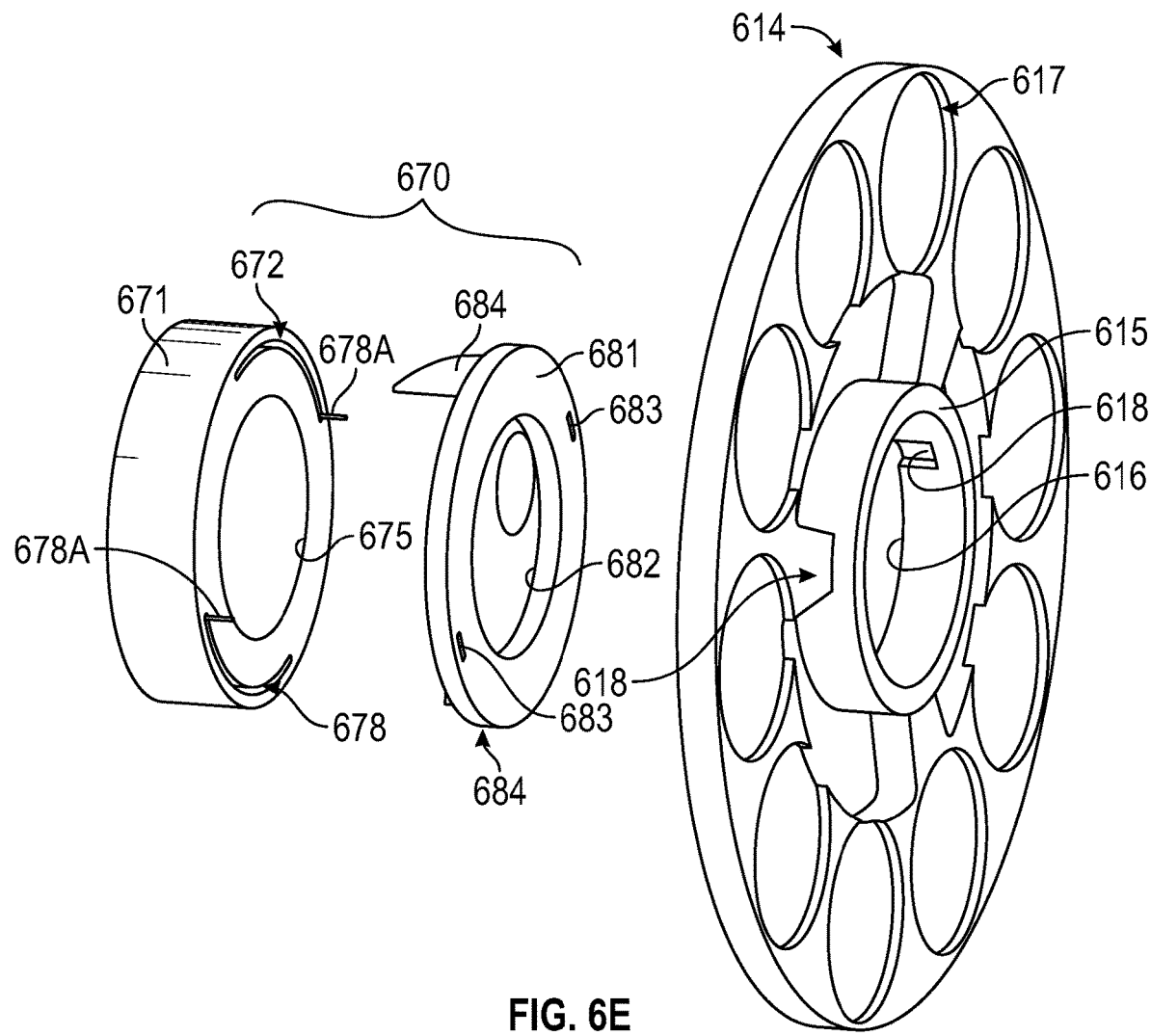
FIG. 6E is an exploded perspective view of a spring wire assembly of the self-retracting lifeline shown in FIG. 6D.
Figure 7:
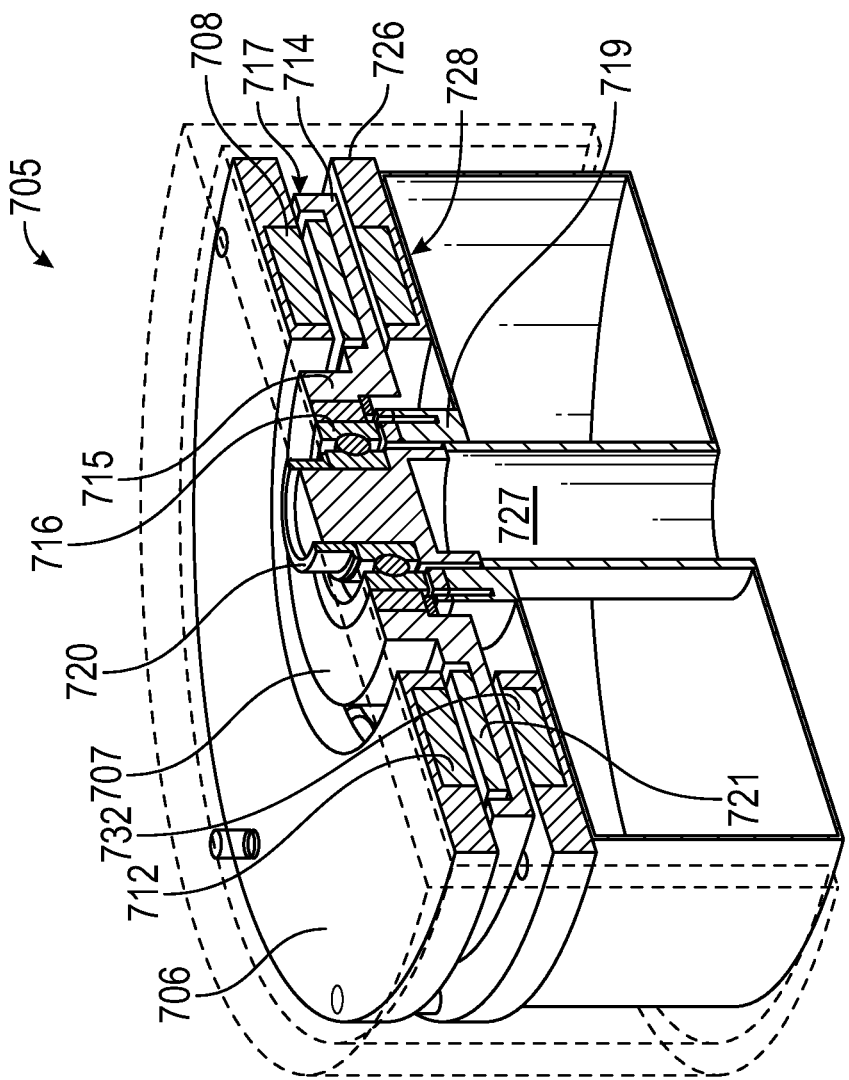
FIG. 7 is a cross-section view of another embodiment flywheel assembly with a one-way clutch and contact brushes.

A flywheel rotor with a one-way clutch could be used to store kinetic energy in response to pulling of the lifeline to generate electrical power when the flywheel rotor is rotating. A one-way clutch allows kinetic energy stored in a flywheel when a lifeline is extended or paid out to be able to be converted into electrical power when the extension has ended as well as when the lifeline is being retracted. The one-way clutch could be a one-way bearing type clutch that is readily available in the market. An example of this is shown in FIG. 6, which is described in more detail below. In order to minimize loss of kinetic energy due to friction in a clutch, the clutch could be comprised of wire springs that are arranged in such a way to allow a flywheel to continue rotating in the direction of extension only. When a lifeline is being extended and causing a lanyard drum to rotate in one direction, the spring wires can translate rotational motions from a drum to a flywheel without bending because they are supported by slot walls in which they are placed. When the extension stops or the lifeline is retracting, the wire will bend to allow the flywheel to continue to rotate in the same direction. When the next extension starts, mechanical energy will be added to the flywheel that is rotating. An example of this is shown in FIGS. 6A, 6B, and 6C, which is described in more detail below. Additionally, the spring wires can function as electrical contact brushes for electric coils that are mounted on the flywheel. The electrical contact brushes connect electricity generated in the electric coils mounted on rotating a flywheel to stationary components of the lanyard. Examples of this are shown in FIGS. 6D, 6E, and 7, which are described in more detail below.

A self-retracting lifeline 600 is illustrated in FIG. 6. Because self-retracting lifelines are well known in the art, only the relevant features are being described herein. The self-retracting lifeline 600 includes a shaft 601 about which a flywheel assembly 605 is rotatably connected. The flywheel assembly 605 includes a first housing plate 606 and a second housing plate 626 between which the other components are housed. The first housing plate 606 includes a central aperture 607, a plurality of recessed portions 608 positioned radially about the central aperture 607 on the inside surface of the first housing plate 606, protrusions 609 extending outwardly from the inside surface of the first housing plate 606, and apertures 610. Each of the recessed portions 608 receives a stator magnet 612. Similarly, the second housing plate 626 includes a central aperture 627, a plurality of recessed portions (not shown) positioned radially about the central aperture 627 on the inside surface of the second housing plate 626, protrusions (not shown) extending outwardly from the inside surface of the second housing plate 626, and apertures 630. Each of the recessed portions receives a stator magnet.

A flywheel rotor 614 includes a cylindrical portion 615 forming a flange extending outward from one side and forming a bore 616 extending therethrough. A plurality of recessed portions 617 are positioned radially about the cylindrical portion 615 and receive coils 621. A bearing 620 extends through the cylindrical portion 615 and is connected to the shaft 601. The protrusions extending outward from the first and second housing plates 606 and 626 are received by the apertures in the other housing plate to connect the housing plates together with the other components sandwiched therebetween.

In operation, extension of the lifeline causes a counter-clockwise rotation of the flywheel rotor 614 and coils 621 relative to the stationary components (606, 612, 622, 626) of the flywheel assembly 605 due to a one-way clutch bearing 620 which locks in the counter-clockwise direction, but allows free rotation in the clockwise direction. Thus the relative motions of the rotating coils 621 and stationary magnets 612 generate electric current in the coils 621. Retraction of the lifeline results in unlocking of the one-way clutch bearing 620 so that the motion of the flywheel rotor 617 remains in the counter-clockwise direction due to the inertia of its rotating mass.

The example shown in FIGS. 6A, 6B, and 6C is similar to that shown in FIG. 6 but the bearing 620 is replaced with a spring wire assembly 650 and a bearing 620a. Therefore, only the substantial differences will be described.

The spring wire assembly 650 includes a clutch seat 651 and a clutch cover 661. The clutch seat 651 is generally cylindrical with a bore 655 and two spring wire receiving portions on opposing sides of the bore 655. Apertures 654 are positioned between the spring wire receiving portions. Each spring wire receiving portion includes a slot 652 in fluid communication with a notched portion 653. The slots 652 and the notched portions 653 receive spring wires 658. Each spring wire 658 includes a first end and a second end. The first end of the spring wire 658 is positioned within the respective slot 652 and the second end of the spring wire 658 extends into the respective notched portion 653. Because the slots 652 are only slightly wider than the spring wires 658, the first ends of the spring wires 658 remain relatively still, and because the notched portions 653 are wider than the spring wires 658, the second ends of the spring wires 658 may move or pivot relative to the first ends when the spring wire assembly 650 rotates.

The clutch cover 661 includes a central aperture 662 aligning with the bore 655 of the clutch seat 651 and apertures 663 aligning with the apertures 654 in the clutch seat 651. Fasteners extend through the apertures 663 and 654 to connect the clutch cover 661 to the clutch seat 651. The spring wire assembly 650 is inserted into the bore 616 of the flywheel rotor 614, which includes notches 618 in the cylindrical portion 615 to receive the second ends of the spring wires 658. A bearing 620a fits within the bore 655 of the clutch seat 651.

In operation, extension of the lifeline causes a counter-clockwise rotation of the flywheel rotor 614 and coils 621 relative to the stationary components of the flywheel assembly 605 due to the spring wire assembly 650 which locks in the counter-clockwise direction, but allows free rotation in the clockwise direction. Thus the relative motions of the rotating coils 621 and stationary magnets 612 generate electric current in the coils 621. Retraction of the lifeline results in unlocking of the spring wire assembly 650 so that the motion of the flywheel rotor 617 remains in the counter-clockwise direction due to the inertia of its rotating mass.

The example shown in FIGS. 6D and 6E is similar to that shown in FIG. 6 but the bearing 620 is replaced with a spring wire assembly 670 and a bearing 620b. Therefore, only the substantial differences will be described.

The spring wire assembly 670 includes a clutch seat 671 and a clutch cover 681. The clutch seat 671 is generally cylindrical with a bore 675 and two spring wire receiving portions on opposing sides of the bore 675. Each spring wire receiving portion includes a slot 672 that receives a spring wire 678. Each spring wire 678 includes a first end (not shown) and a second end 678a. The first end of the spring wire 678 is positioned within the respective slot 652 and the second end 678a of the spring wire 678 extends outward from the slot 652.

The clutch cover 681 includes a central aperture 682 aligning with the bore 675 of the clutch seat 671, slots 683 aligning with the second ends 678a of the spring wires 678, and flanges 684 aligning with the slots 672 of the clutch seat 671. The flanges 684 extend into the slots 672 and the second ends 678a of the spring wires 678 extend through the slots 683 thereby connecting the clutch seat 671 and the clutch cover 681. The spring wire assembly 670 is inserted into the bore 616 of the flywheel rotor 614, which includes notches 618 in the cylindrical portion 615 to receive the second ends 678a of the spring wires 678. A bearing 620a fits within the bore 655 of the clutch seat 651.

In operation, extension of the lifeline causes a counter-clockwise rotation of the flywheel rotor 614 and coils 621 relative to the stationary components of the flywheel assembly 605 due to the spring wire assembly 650 which locks in the counter-clockwise direction, but allows free rotation in the clockwise direction. Thus the relative motions of the rotating coils 621 and stationary magnets 612 generate electric current in the coils 621. Retraction of the lifeline results in unlocking of the spring wire assembly 650 so that the motion of the flywheel rotor 617 remains in the counter-clockwise direction due to the inertia of its rotating mass.

FIG. 7 illustrates an alternate embodiment that is similar to that shown in FIG. 6 but the flywheel assembly 605 is replaced with a flywheel assembly 705.

The flywheel assembly 705 includes a first housing plate 706 and a second housing plate 726 between which the other components are housed. The first housing plate 706 includes a central aperture 707, a plurality of recessed portions 708 positioned radially about the central aperture 707 on the inside surface of the first housing plate 706, protrusions (not shown) extending outwardly from the inside surface of the first housing plate 706, and apertures (not shown). Each of the recessed portions 708 receives a stator magnet 712. Similarly, the second housing plate 726 includes a central aperture 727, a plurality of recessed portions 728 positioned radially about the central aperture 727 on the inside surface of the second housing plate 726, protrusions (not shown) extending outwardly from the inside surface of the second housing plate 726, and apertures (not shown). Each of the recessed portions receives a stator magnet 732.

A flywheel rotor 714 includes a cylindrical portion 715 forming a flange extending outward from one side and forming a bore 716 extending therethrough. A plurality of recessed portions 717 are positioned radially about the cylindrical portion 715 and receive coils 721. A bearing 720 extends through the cylindrical portion 715 and is connected to the shaft of the self-retracting lifeline. The protrusions extending outward from the first and second housing plates 706 and 726 are received by the apertures in the other housing plate to connect the housing plates together with the other components sandwiched therebetween.

In operation, extension of the lifeline causes a counter-clockwise rotation of the flywheel rotor 714 and coils 721 relative to the stationary components of the flywheel assembly 705 due to the one-way clutch 719 which locks in the counter-clockwise direction, but allows free rotation in the clockwise direction. Thus the relative motions of the rotating coils 621 and stationary magnets 612 generate electric current in the coils 621. Retraction of the lifeline results in unlocking of the one-way clutch 719 so that the motion of the flywheel rotor 717 remains in the counter-clockwise direction due to the inertia of its rotating mass.

Electrical power could also be generated using an eddy current braking system whereby a portion of the eddy currents generated are converted to energy. An example of a device that could utilize an eddy current braking system is a self-retracting lifeline, a descender, or a controlled descent device. Generally, an electromagnetic field ("EMF") force could be used to at least enhance the braking mechanism or act as the braking mechanism of self-retracting lifelines, descenders, and controlled descent devices, and the EMF could also be used to generate electrical power.

The housings of the self-retracting lifelines and descenders are preferably at least partially made from a non-ferromagnetic, electrically conductive material such as, but not limited to, aluminum, and magnets are mounted on cylindrical or other axis-symmetric shapes that spin relative to the housings. The magnets spin because they are mechanically connected through gearing and drums to lifelines. The faster the magnets spin, the larger the EMF forces are exerted on them in the opposite direction they are spinning. Since the force is in the opposite direction to the movement of the magnets, a braking force is applied to the magnets. This braking force is transmitted through the gearing and the drums to the lifelines and is dissipated as heat. The magnets do not contact the housings and, thus, do not wear out as conventional braking mechanisms.

Figure 8:
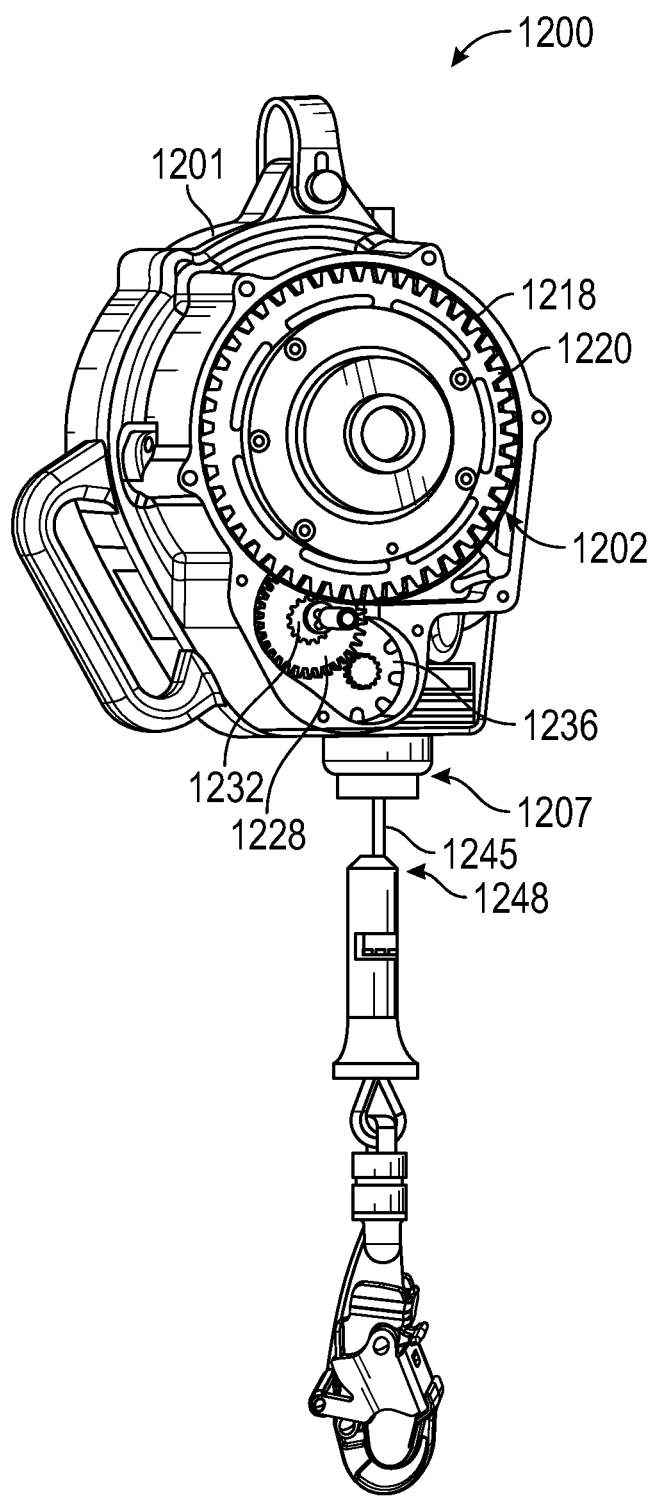
FIG. 8 is a side perspective view of a self-retracting lifeline with a cover removed.
Figure 9:
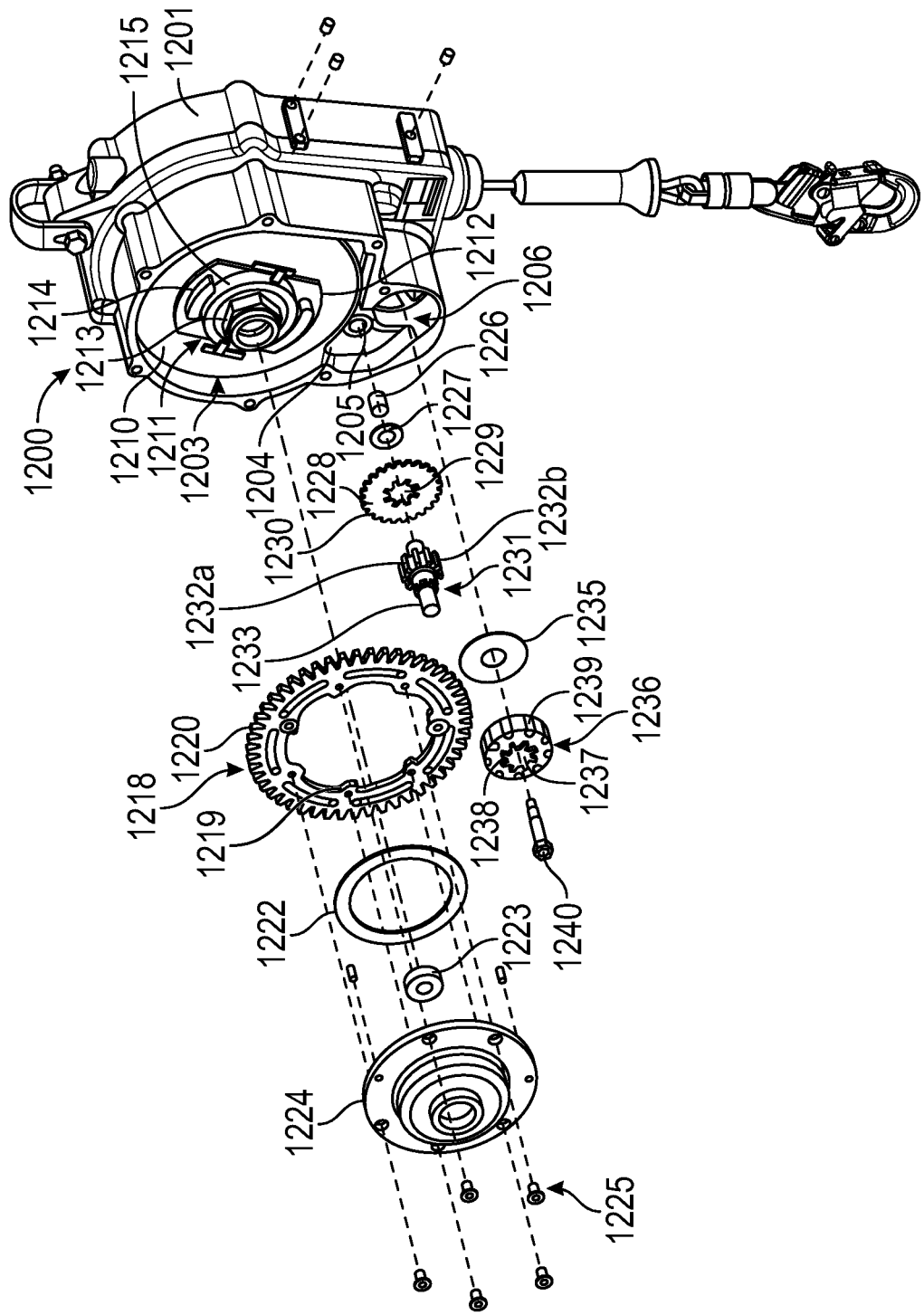
FIG. 9 is a partially exploded side perspective view of the self-retracting lifeline shown in FIG. 8.

An embodiment self-retracting lifeline constructed according to the principles of the present invention is designated by the numeral 1200 in FIGS. 8 and 9. Although one type of self-retracting lifeline is shown and described herein for use with the present invention, it is recognized that any suitable self-retracting lifeline could be used. Because self-retracting lifelines suitable for use with the present invention are well-known, only the components of the self-retracting lifeline 1200 relevant to the description of the present invention are being described herein.

The self-retracting lifeline 1200 includes a housing 1201 defining a cavity 1202 having a first compartment 1203, a second compartment 1204, and a third compartment 1206. A bore 1205 extends at least partially through the housing 1201 proximate a middle portion of the second compartment 1204. The housing 1201 also includes a cable exit 1207.

A drum 1210, around which a lifeline 1245 is wound, is rotatably connected to the housing 1201 and fits within the first compartment 1203. The lifeline 1245 includes a first end (not shown) operatively connected to the drum 1210, an intermediate portion (not shown) wound about the drum 1210, and a second end 1248 extending through the cable exit 1207 of the housing 1201. A brake mechanism 1211 is operatively connected to the drum 1210.

The brake mechanism 1211 includes several components in each of the three compartments. In the first compartment 1203, a base plate 1212 is operatively connected to the drum 1210, and brake discs 1213 and pawls 1214 biased with springs 1215 are operatively connected to the base plate 1212. A gear 1218 fits within the first compartment 1203 proximate the base plate 1212 and includes inner teeth 1219 and outer teeth 1220. A bushing 1223 fits within a bore (not shown) of the drum 1210 to assist in rotation of the drum 1210 about a shaft (not shown). A cover 1224 is operatively connected to the gear 1218 with fasteners 1225. An isolation disc 1222 reduces the friction between the pawls 1214 and the cover 1224.

Figure 9A:
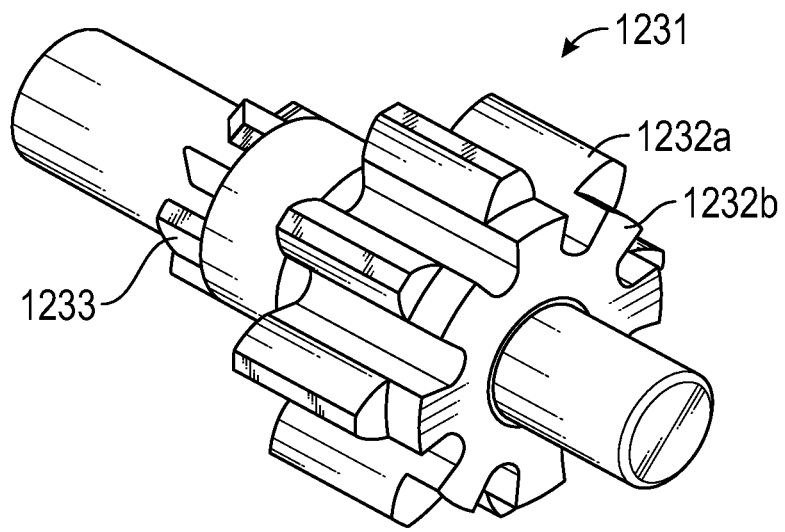
FIG. 9A is a perspective view of a shaft of the self-retracting lifeline shown in FIG. 9.

In the second compartment 1204, a bushing 1226 fits within the bore 1205 and a spacer 1227 and a gear 1228 fit about the bore 1205. The gear 1228 includes inner teeth 1229 and outer teeth 1230. A shaft 1231 includes teeth 1232a, teeth 1232b, and teeth 1233 extending outward therefrom proximate an intermediate portion of the shaft 1231. The teeth are shown in FIG. 9A. One end of the shaft 1231 extends into the bushing 1226 within the bore 1205, the teeth 1232a mate with the outer teeth 1220 of the gear 1218, the teeth 1232b mate with the inner teeth 1229 of the gear 1228, and the teeth 1233 selectively mate with a mode control assembly (not shown) such as that disclosed in U.S. Patent Application Publication Nos. 2010/0226748A1 and 2010/0224448A1.

In the third compartment 1206, a disc 1235 is positioned proximate the housing and a cylinder 1236 is positioned within the third compartment 1206. The cylinder 1236 includes a bore 1237 and teeth 1238 positioned about the bore 1237. The teeth 1238 mate with the outer teeth 1230 of the gear 1228. Magnets 1239 are operatively connected to the cylinder 1236, preferably proximate the cylinder's perimeter. A fastener 1240 extends through the bore 1237 and through a bore (not shown) in the housing to rotatably connect the cylinder 1236 to the housing 1201. The disc 1235 is used to reduce friction as the cylinder 1236 rotates.

Figure 10:
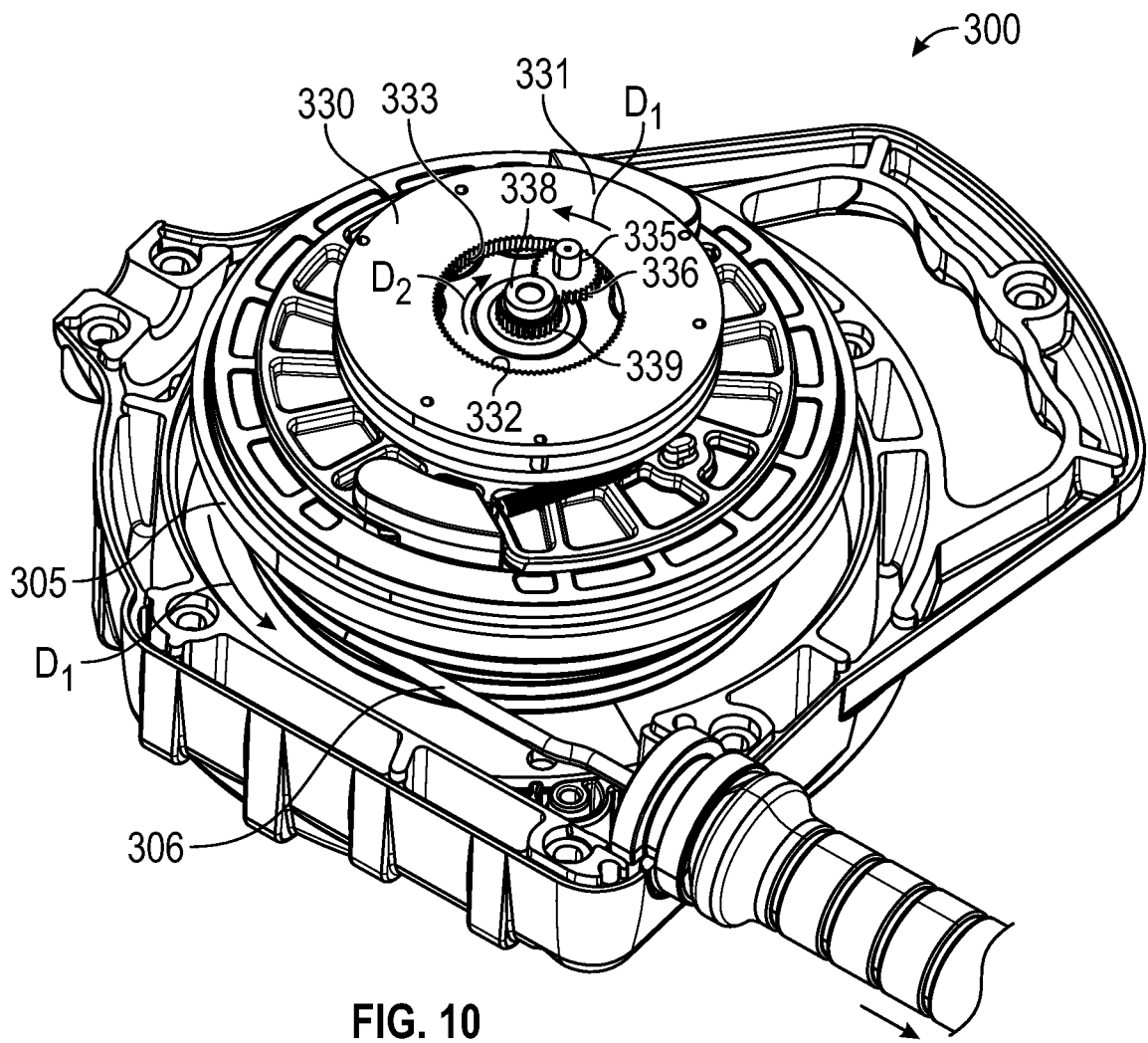
FIG. 10 is a front perspective view of a self-retracting lifeline with a cover removed and including a planetary gear assembly.

As shown in FIG. 10, a planetary gear assembly 330 could be integrated with the self-retracting lifeline 300 such that the drum 305 is connected to a stator gear 331 that rotates in response to pulling and retracting of the lifeline 306, the stator gear 331 rotates a star gear 335, and the star gear 335 rotates a rotor gear 338 at a faster speed than the drum 305 in an opposite direction to generate electrical power. The stator gear 331 is connected to the drum 305 and rotates with the drum 305. The stator gear 331 is generally disc-shaped and includes an opening 332 proximate its center. The stator gear 331 includes teeth 333 proximate the opening 332. The star gear 335 and the rotor gear 338 extend into the opening 332. The stator gear's teeth 333 mate with teeth 336 of the star gear 335, and the star gear's teeth 336 mate with teeth 339 of the rotor gear 338. The lifeline 306 is wound about the drum 305. As the lifeline 306 is paid out from the drum 305, the drum 305 and the stator gear 331 rotate in direction D1, which ultimately causes the rotor gear 338 to rotate in direction D2.

Figure 11:
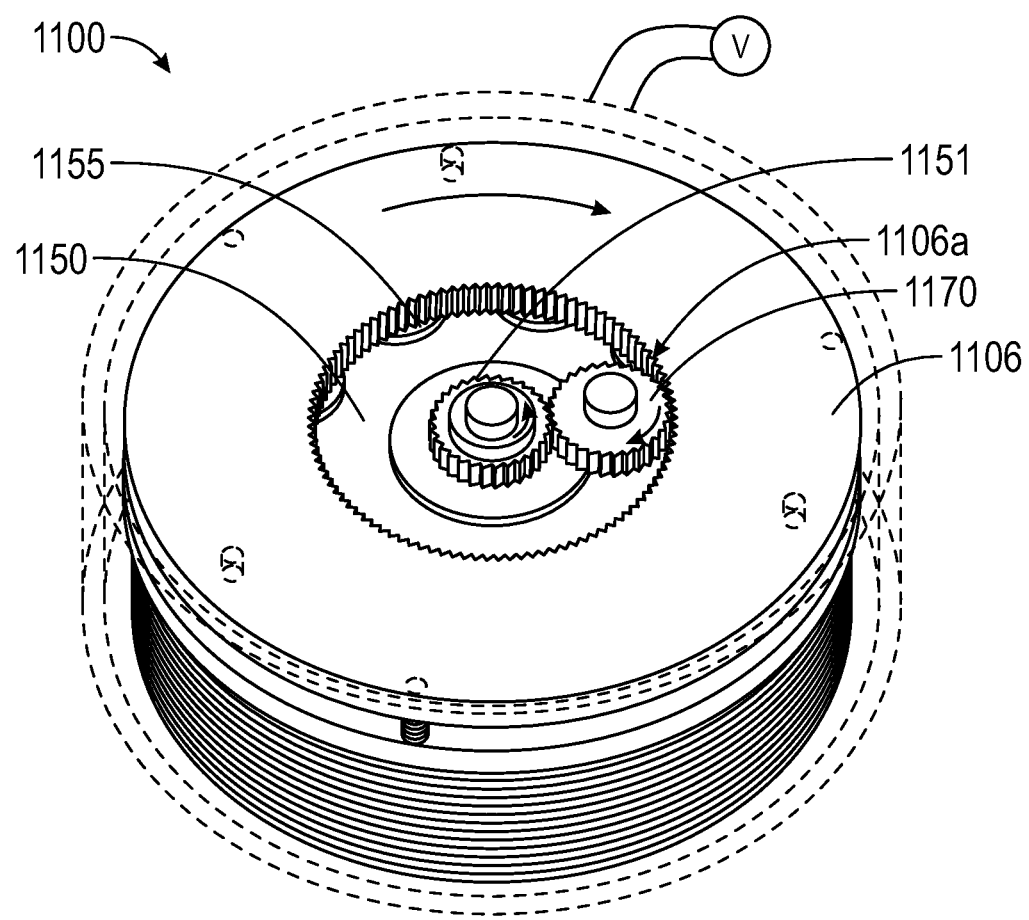
FIG. 11 is a perspective view of a planetary gear assembly.
Figure 12:
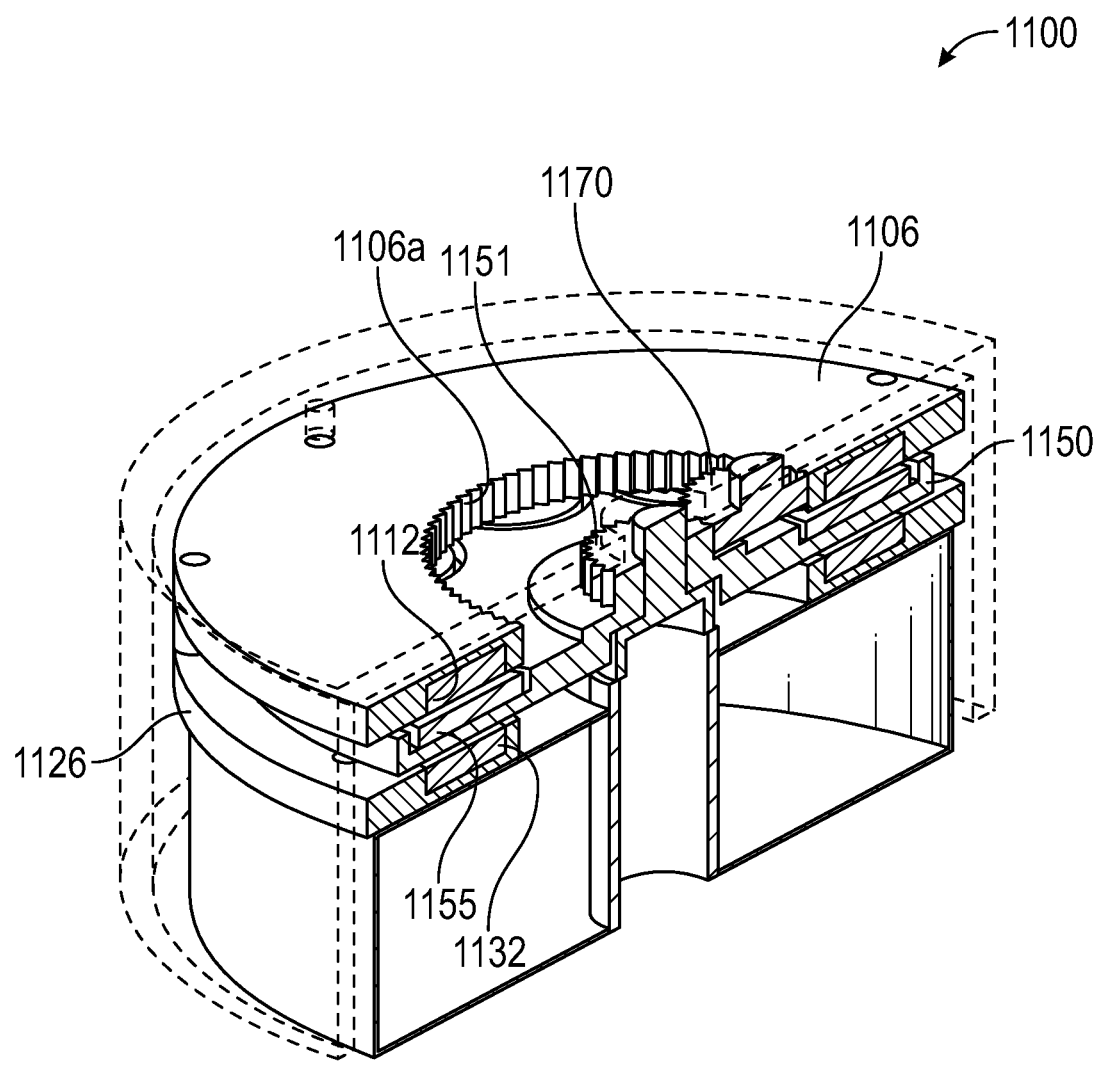
FIG. 12 is a cross-section view of the planetary gear assembly shown in FIG. 11.

As illustrated in FIGS. 11 and 12, the drum 1100 includes a mechanical retracting coil and line spool, as is well known in the art of self-retracting lifelines, and two sets of stator magnets 1112 and 1132 are mounted on the stator plates 1106 and 1126 on generally opposing sides of a rotor gear 1151 of a rotor plate 1150. The stator plate 1106 has inside gear teeth 1106a. A star gear 1170 connects the stator plate's inside gear teeth 1106a to the teeth on the rotor gear 1150 where electric coils 1155 are mounted. As the lifeline is being pulled or being retracted, the drum 1100 rotates. Through the star gear 1170, the rotor gear 1151 rotates at a much higher speed than the drum 1100, and the rotations of the rotor gear 1151 and the drum 1100 are in opposite directions. Thus, electric currents are generated by the electric coils 1155 mounted on the rotor plate 1150. As the electricity is generated in the electric coils 1155, magnetic fields are generated around the electric coils 1155. As those magnetic fields are moving relative to the magnetic fields created by the stator magnets 1112 and 1132 on the stator plates 1106 and 1126, forces are created between the rotor plate 1150 and the stator plates 1106 and 1126. Noting the stator plate 1126 rotates with the drum 1100 of the mechanical retracting system, the force will absorb energy (i.e., slow the rate of rotation of the drum and thereby slow the rate at which the lifeline pays out) when a fall occurs. The faster the rate at which the lifeline pays out, the greater the speed differential is between the stator plate 1106 and the rotor gear 1151, which generates higher electric current and stronger magnetic fields in the coils 1155 resulting in stronger force and energy absorption.

Because electric coils are conductors that induce dragging (braking) force for energy absorption, a desired amount of "conductors" could be added solely for the purpose of generating eddy currents to increase the dragging force. A balanced amount of electric coils and eddy current conductors may be achieved in order to generate the desired amount of harvested energy as well as desired amount of absorbed energy.

The planetary gear assembly is compact and, if desired, there are a number of ways to increase the rotational speed of the rotor gear using various gear train configurations if desired to harvest more energy and/or to achieve sufficient force for dissipating/absorbing energy from a fall. It is also possible to drive a flywheel with one-way clutch through a planetary gear assembly to increase the speed if it is desired to harvest more energy and/or to achieve sufficient force to dissipate/absorb energy from a fall.

A planetary gear assembly could also be used with self-retracting lifelines including mechanical braking or eddy current braking, as previously described.

In a self-retracting lifeline utilizing eddy current braking, there could be two sets of stationary magnets on both sides of a set of conductors. Driven by a set of star gears with a ratio of 1:6 to 1:10, the conductors rotate fast as the lifeline is being pulled and retracted and eddy currents are induced in them. Multiple coils could be used on the conductor and electric currents could be generated in the coils while still maintaining the eddy current effects for braking. This utilizes magnets already existing in the eddy current braking and kinetic energy that is created in the conductors. In other works, small amount of the eddy current are converted to electric currents to power wireless sending and communication.

The second set of magnets, as compared to a design with only one stationary set of magnets, can be stationary or can be mounted on the drum. If both sets of magnets rotate, extra force may be required to pull the lifeline due to relative movement of the two sets of magnets, which may or may not be desirable. The extra force could be used as magnetic braking or energy absorbing.

Using the example in Table 2, a flywheel of 0.25 kgm will store 0.18 Joule of kinetic energy, which is about 1.5% of the energy to pull the lifeline for 1 foot but 6 to 18 times the energy needed for making a wireless communication. This is shown in Table 3.

TABLE 3

Flywheel

| Distance (meters) | Mass (kg) | S @ end (m/s) | Change in Kinetic Energy (Joule) |
|---|---|---|---|
| 0.080 | 0.250 | 1.200 | 0.180 |

A self-retracting lifeline, or a one-way clutch, as previously described, exhibits minimal friction thus minimizing loss of kinetic energy through a clutch when the lifeline is not pulled or retracted. By using metal spring wires to build such a one-way clutch, they also serve as electric contact brushes to conduct electric currents from rotating coils, thus eliminating additional loss of kinetic energy to friction through separate electric contact brushes. Forces on a spring wire and its effective length in both states of forces rotation and free rotation are illustrated in FIGS. 6D, 6E, 7A, and 7B. The force on the wire is to the third power of its effective length while it is directly proportional to its deflection. For example, if L is 10 times of 1, the force to bend the wire in the direction of free rotation is $1/1000^{th}$ of that in the direction of forced rotation to yield the same amount of deflection. Even when required deflection is 10 times larger in free rotation the force is still $1/100^{th}$ of the force in forced rotation.

It is recognized that any suitable type of self-retracting lifeline or descender could be used and the invention is not limited to use with the type of self-retracting lifelines and descenders shown and described herein.

Sensors

A rotational sensor could be used to record at least one of a length of extension of the elongate member and a length of retraction of the elongate member.

A switch activated when the elongate member is fully retracted could be used as a sensor.

A switch activated when the elongate member extends in length could be used as a sensor.

Figure 13:
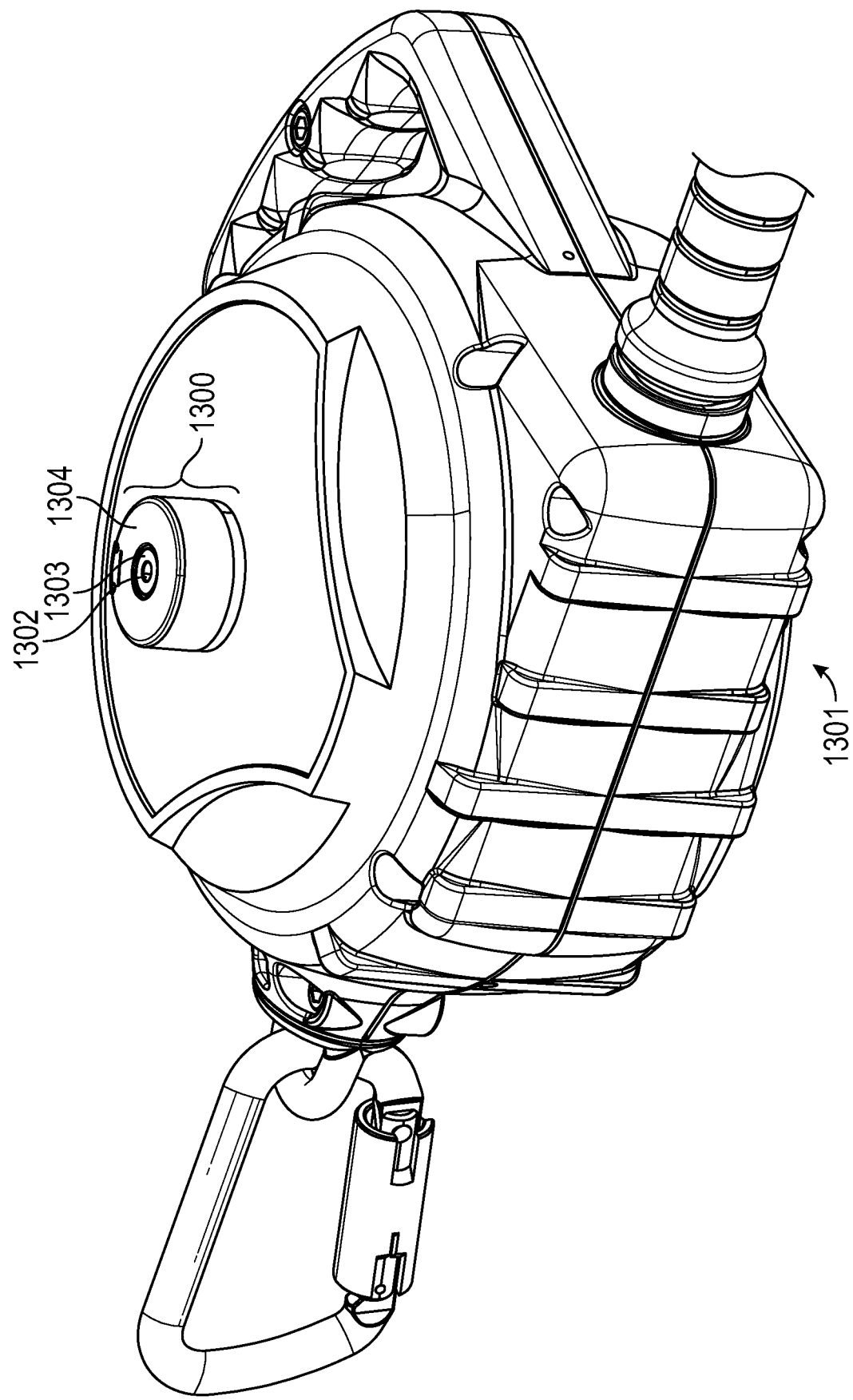
FIG. 13 is a perspective view of a self-retracting lifeline including an encoder assembly.

Encoders could be used as sensors. An example of a self-retracting lifeline including an encoder assembly is shown in FIG. 13. An encoder 1300 is concentrically attached to a rotating shaft 1302 extending from a housing 1301. The rotating shaft 1302 is concentrically attached to a rotating collar 1303 which may be enclosed by a housing 1304, the rotation of which is detected by sensors including but not limited to optical sensors, Hall-effect sensors, and the like.

Figure 24:
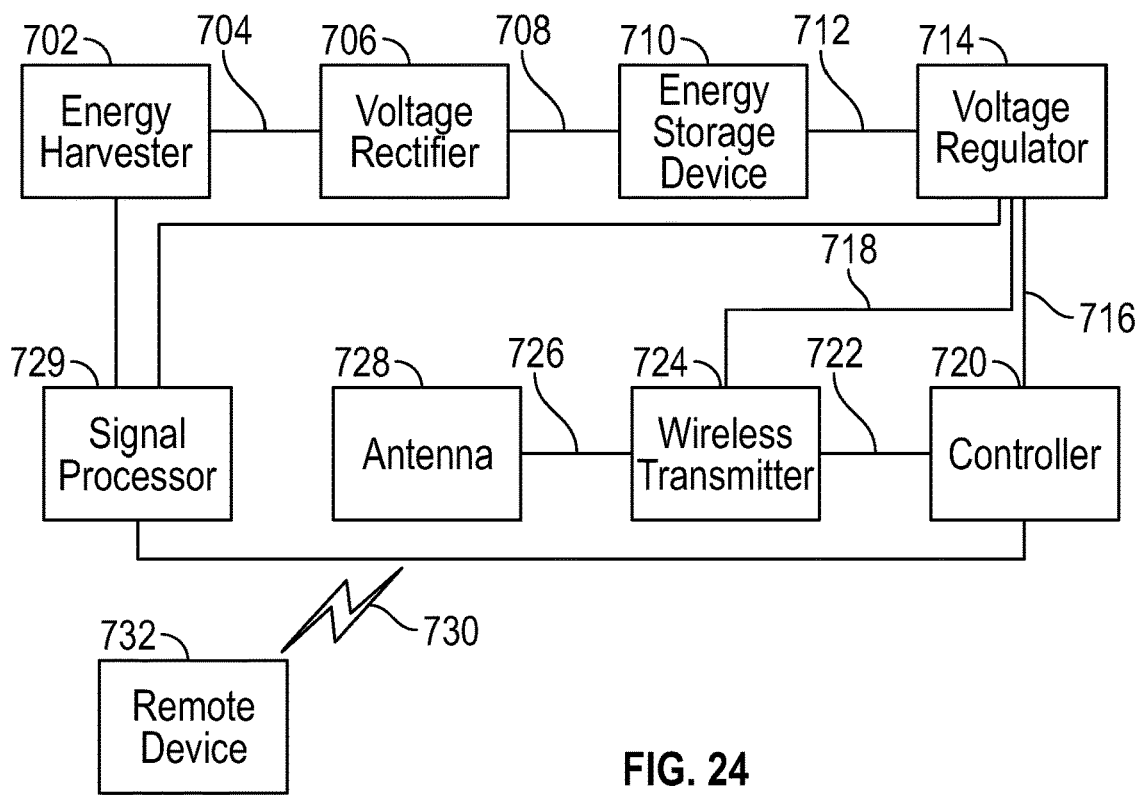
FIG. 24 is a block diagram illustrating an alternate embodiment communication system.

Previous embodiments describe usage of motors and motors with gear trains as well as assemblies of rotary coils and stationary magnets to generate electricity by harvesting energy from changing length of self-retracting lifelines. Because electric currents or voltages such generated are sine waves, the number of sine waves correspond to angles of rotations of rotating components in the self-retracting lifelines. By converting the sine waves into electric pulses or square waves, one can use the motor as an encoder by counting numbers of the sine waves. For example, if a motor has four pair of magnetic poles, one rotation of the motor produces four sine waves, which can be easily converted to eight square waves or pulses, each representing ⅛ rotation or 45 degrees rotation. A gear or gear train will greatly improve efficiency or power of energy generating for the motor to rotate at a high speed. The gear or gear train will also greatly improve resolution or precision of the motor as an encoder. For example, if a gear ratio of 10:1 is used, the motor will be turned at 20 times the rpm of the driving shaft of a self-retracting lifeline's drum. Thus, one turn of the driving shaft results in 10×8=160 square waves or pulses, each representing 360/80=4.5 degrees turning of the shaft. At the same time, a motor rotating 10 times faster is much more efficient in generating electricity. FIG. 24 illustrates the dual functions of such an energy harvester 702 as a sensor in the system as well as a power supply.

FIG. 24 is a block diagram illustrating one example of a communication system 700 for use in a fall protection device. Communication system 700 includes an energy harvester 702, a voltage rectifier 706, an energy storage device 710, a voltage regulator 714, a controller 720, a wireless transmitter 724, an antenna 728, and a remote device 732. Energy harvester 702 is electrically coupled to voltage rectifier 706 through a power path 704. Voltage rectifier 706 is electrically coupled to energy storage device 710 through a power path 708. Energy storage device 710 is electrically coupled to voltage regulator 714 through a power path 712. Voltage regulator 714 is electrically coupled to controller 720 through a power path 716 and to wireless transmitter 724 through a power path 718. Controller 720 is communicatively coupled to wireless transmitter 724 through a communication path 722. Wireless transmitter 724 is electrically coupled to antenna 728 through a signal path 726. Energy harvester 702 as a sensor is also electrically coupled to signal processor 729. Signal processor 729 receives power from energy storage device 710 and sends output signal from energy harvester 702 to controller 720.

Figure 14:
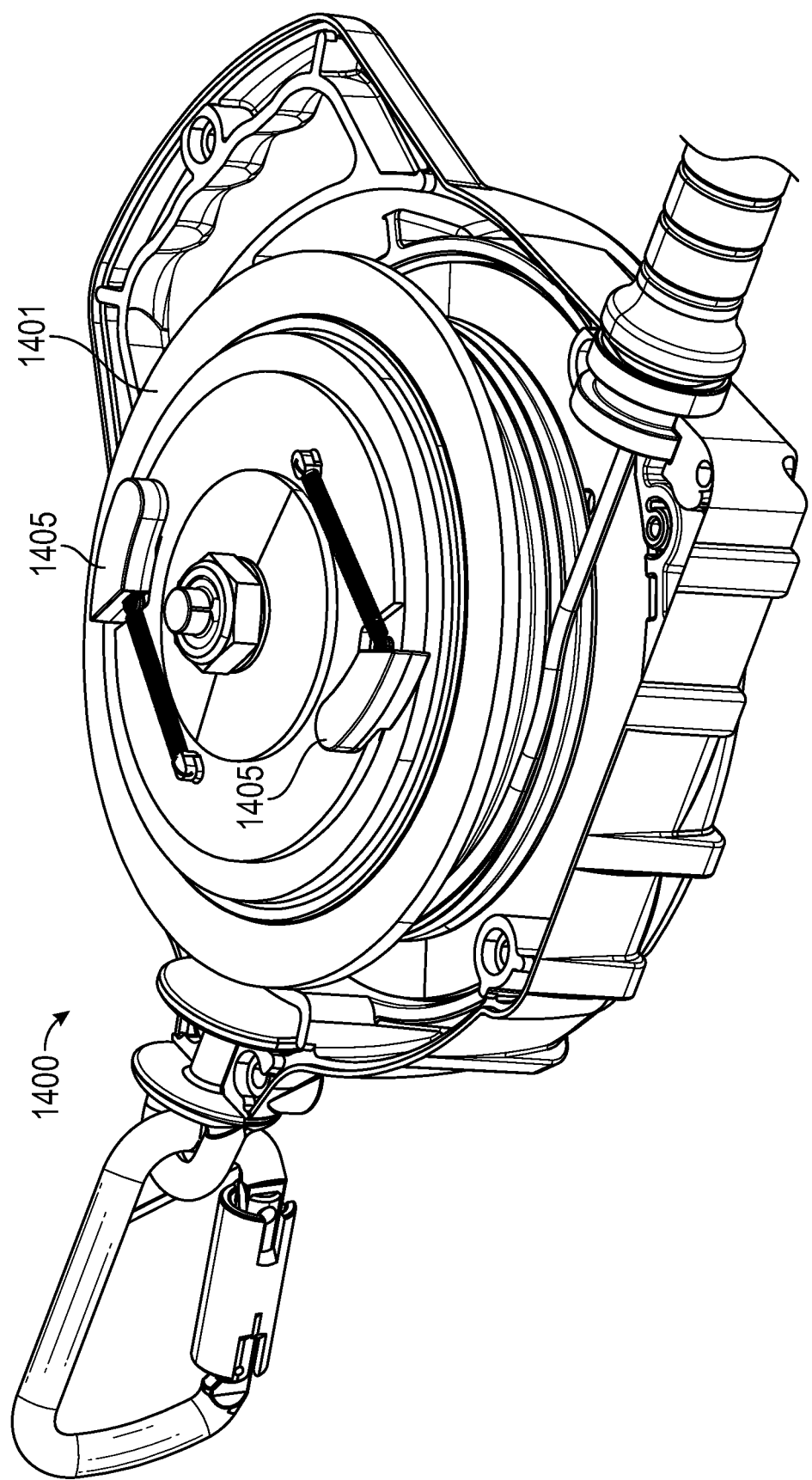
FIG. 14 is a perspective view of a self-retracting lifeline including eccentric deflectors or pawls.

Displacement of eccentric deflectors or pawls could be used as a sensor. An example of a self-retracting lifeline 1400 including eccentric deflectors or pawls is shown in FIG. 14. The deflectors or the pawls 1405 move as the drum 1401 of the self-retracting lifeline 1400 rotates with angular speeds and/or accelerations. A person with ordinary skill in the art could determine many ways to detect motions with a sensor or sensors (not shown in FIG. 14). The ways include but are not limited to optical sensors, Hall-effect sensors, strain gauge sensors, and the like.

Sensors could also be used as environmental monitors providing information relating to ambient conditions, audible conditions, and air quality conditions.

Sensors could also be used to provide use pattern information.

An impact indicator and a sensor could be used to provide information relating to an impact. For example, acceleration equal to gravity, followed by a high load for a short duration, followed by a load equivalent to a user's weight for a longer duration along with no further movement of the fall protection device could be sensed to provide information indicating a fall has occurred.

Capacitor

The electric power could be stored in a capacitor and regulated to power electronics for communication. Storing the electrical power allows the wireless communication to occur for a longer duration than the duration during which energy is harvested, for a shorter duration at a higher power, or for use some time after the energy was collected.

Fall Alert Indicators

Fall alert indicators could provide visual indication (e.g., light), audible indication (e.g., audible alarm), haptic indication (e.g., vibration), or other perceptible cues that the fall protection device has sustained an impact. On-board or remote indicators could be used. Examples of remote indicators include wearable indicators (e.g., a visual indicator on glasses or hats; an audible indicator on earpieces or headsets; a haptic indicator on bracelets, helmets, or earpieces).

Figure 15:
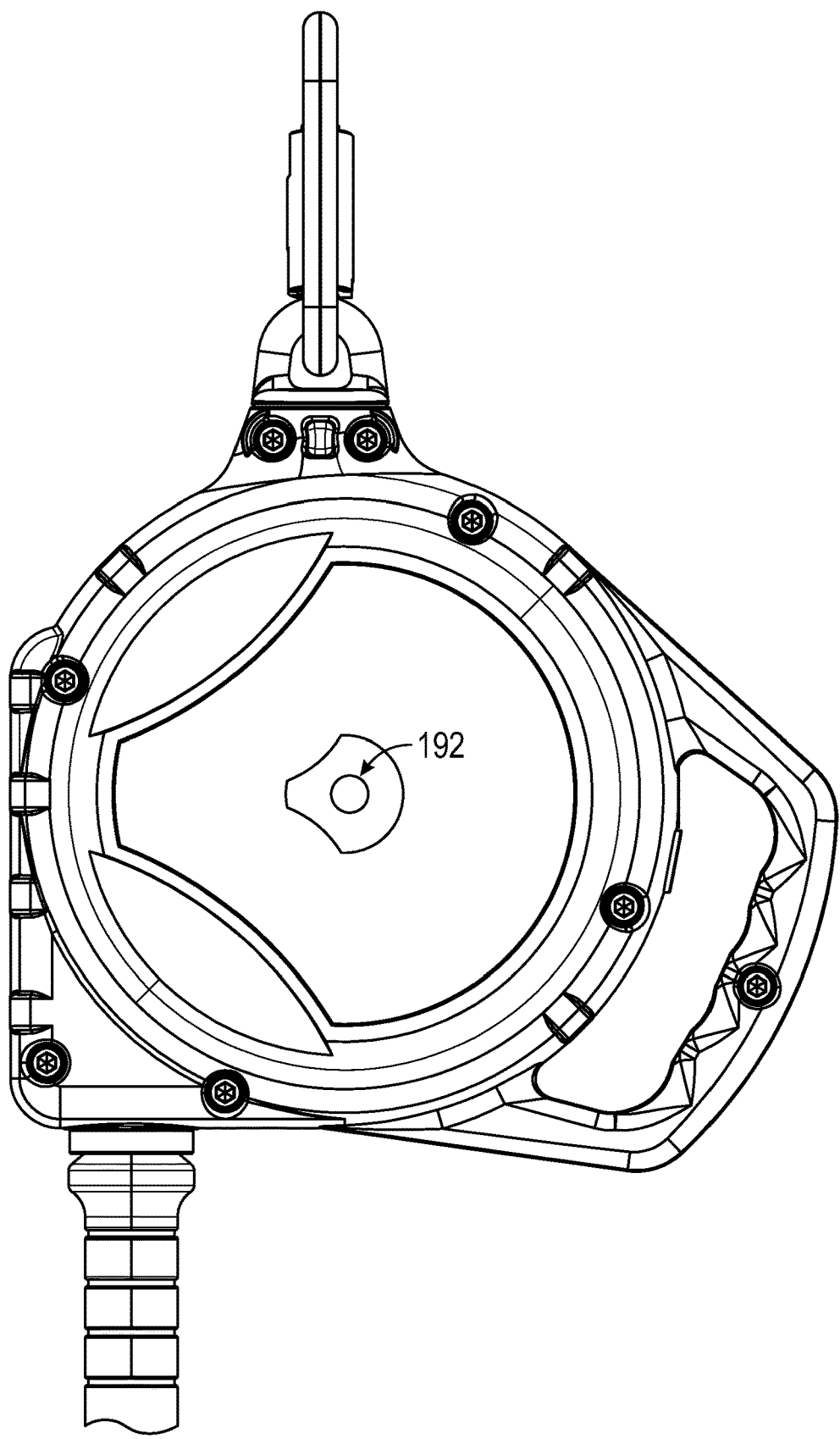
FIG. 15 is a front view of a self-retracting lifeline including a visual alert.

FIG. 15 shows a self-retracting lifeline with a visual alert, a light 192.

Figure 16:
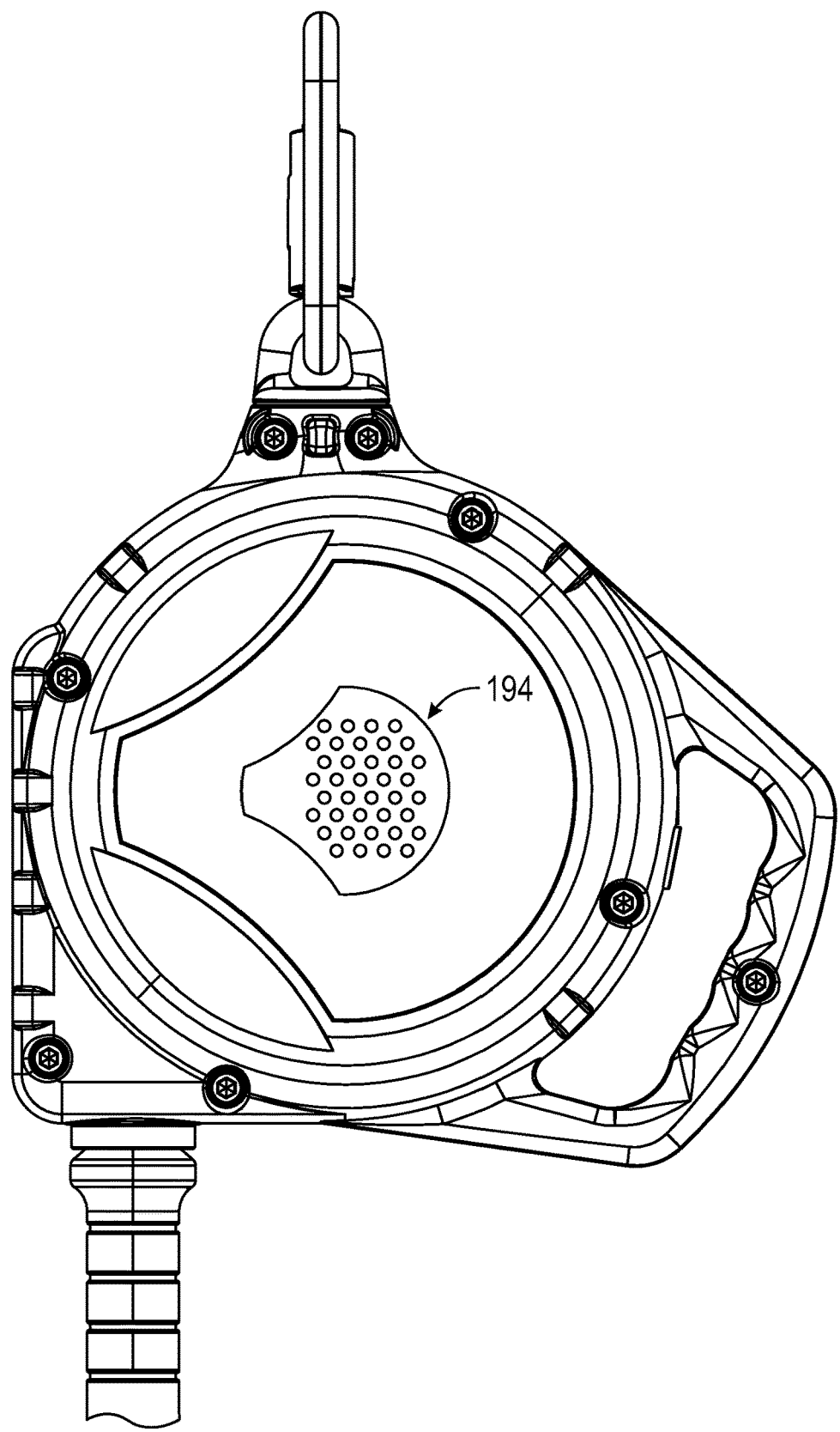
FIG. 16 is a front view of a self-retracting lifeline including an audible alert.

FIG. 16 shows a self-retracting lifeline with an audible alert, a speaker 194.

Figure 17:
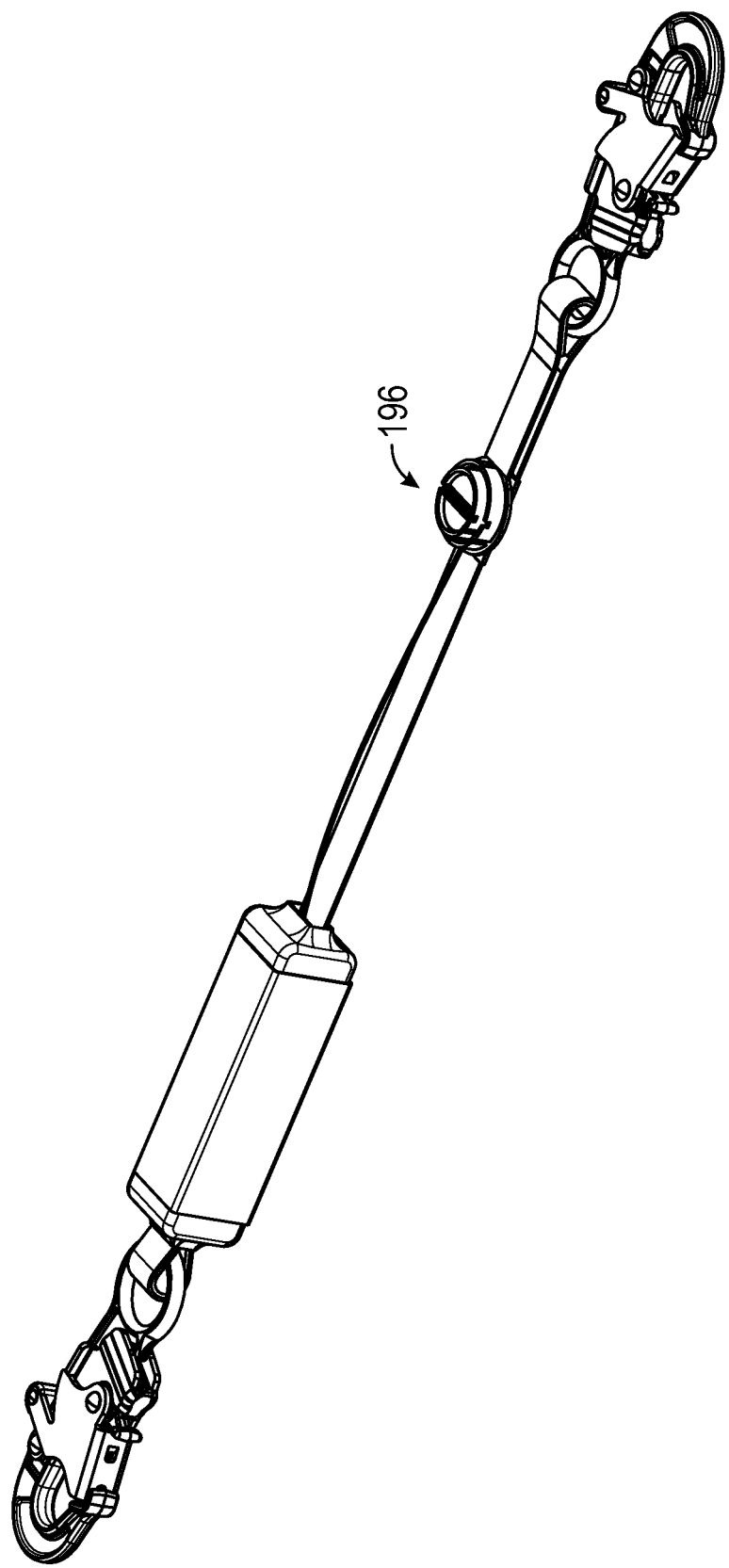
FIG. 17 is a front perspective view of a lanyard including a breaking element.

FIG. 17 shows an energy absorbing lanyard with a breaking element 196.

Figure 18:
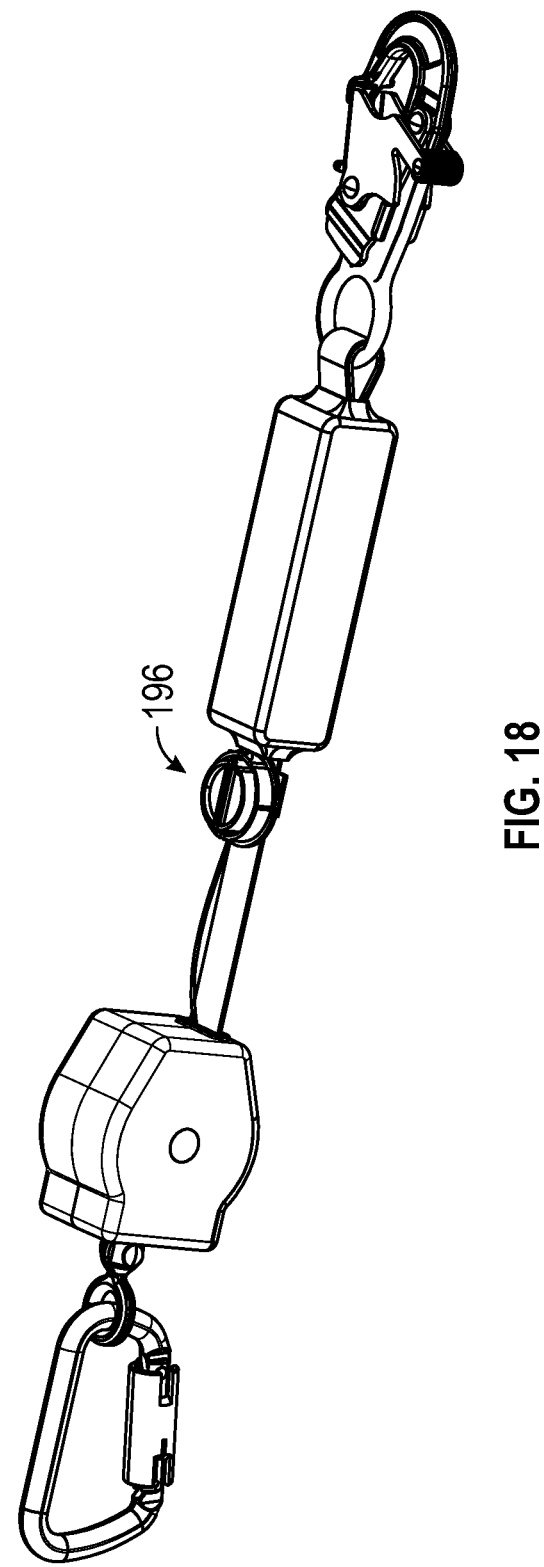
FIG. 18 is a front perspective view of a self-retracting lifeline including a breaking element.

FIG. 18 shows a self-retracting lifeline with a breaking element 196.

Impact Indicators

Impact indicators are commonly used with fall protection devices to provide indication that the devices have been impacted either by a fall or other cause. Impacted devices generally should be removed from service to ensure reliability.

An impact indicator could be connected to the elongate member, and a controller could be connected to at least one of the impact indicator and the elongate member to generate a message in response to an impact.

The impact indicator could be a mechanical switch, such as a biasing member, to make or break electrical contacts corresponding to predetermined tension applied to the lifeline. When the tension on a self-retracting lifeline exceeds at least one threshold (e.g., the arresting force of the self-retracting lifeline), electrical contact is made. This can be accomplished by introducing a compressive element (e.g., a spring) between the element used to suspend the self-retracting lifeline to an anchorage (e.g., the swivel) and the housing, such that when a load is placed across the self-retracting lifeline, the compressive element is compressed, allowing electrical contact to be made at a pre-determined compression distance. The electrical contacts are connected to the element used to suspend the self-retracting lifeline and the housing of the self-retracting lifeline. One of the contacts is stationary, the other is capable of linear displacement equal to the compression of the compressive element. This arrangement is also conceivable using an extension element in place of the compression element.

Figure 19A:
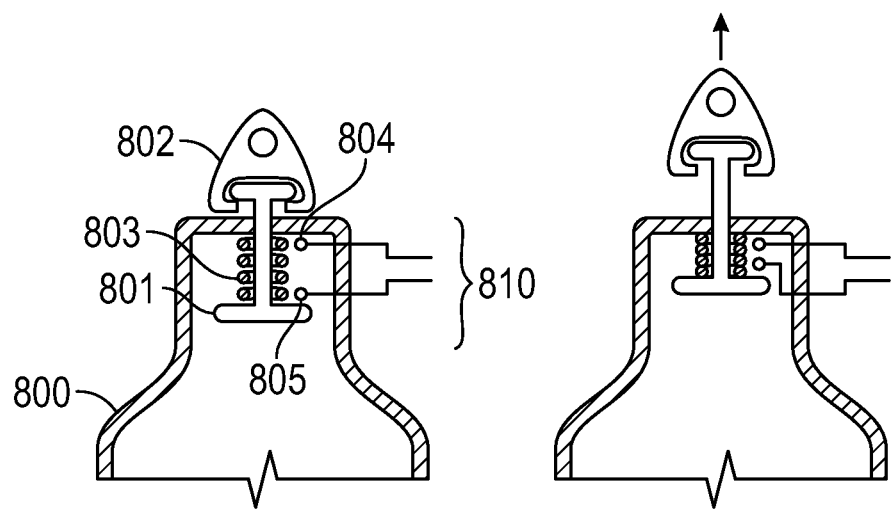
FIG. 19A is a cross-section view of a connector and a carabiner of a self-retracting lifeline including an impact indicator in a closed position.
Figure 19B:
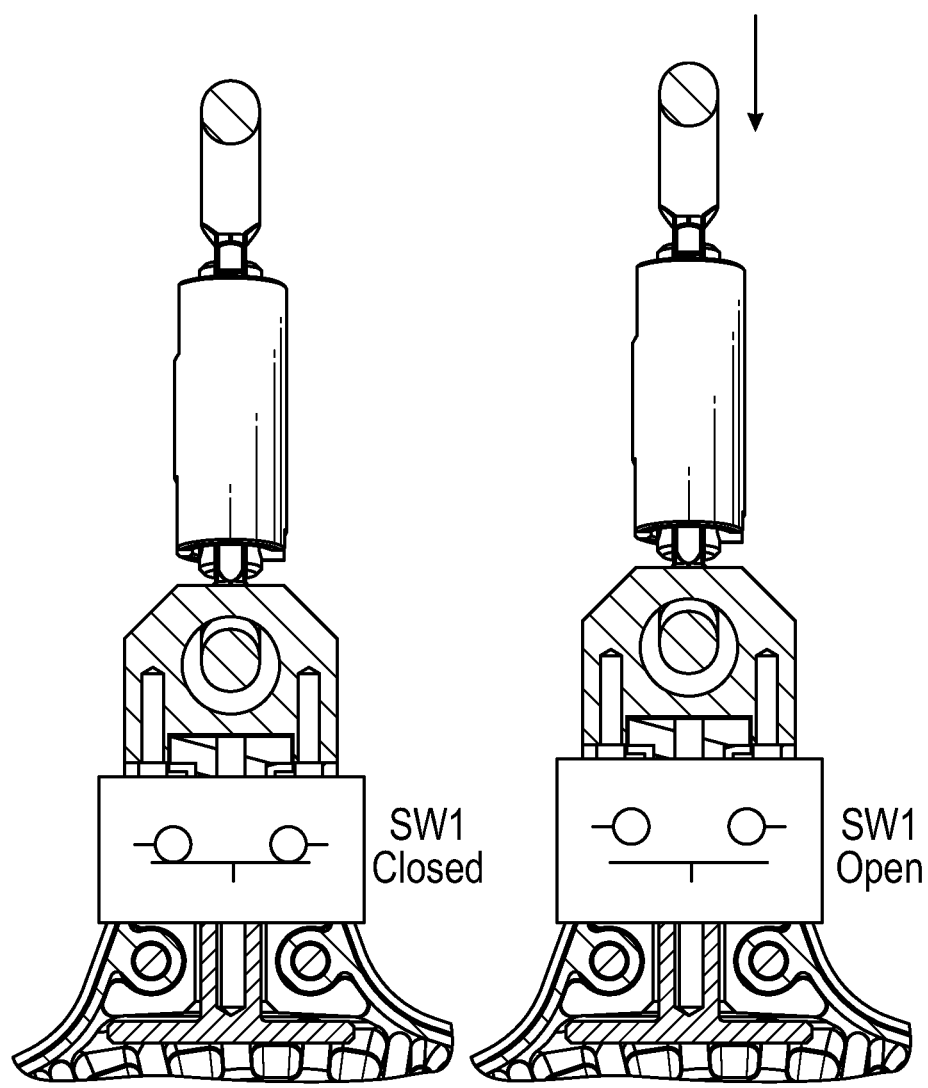
FIG. 19B is a cross-section view of the connector and the carabiner shown in FIG. 19A with the impact indicator in an open position.

More specifically, as shown in FIGS. 19A and 19B, a swivel assembly is comprised of a first part 801 and a second part 802. A compression spring 803 is positioned between the first part of the swivel assembly 801 and a housing 800. Within the housing is an electrical switch 810 comprised of a first electrical contact 804 and a second electrical contact 805. Tension is applied to the elongate member and compresses the compression spring 803. When the compression spring 803 is compressed to a predetermined height the first electrical contact 804 and second electrical contact 805 make contact completing an electrical circuit. It is recognized that the opposite could be done, too, because tension could open the contacts if the spring is located between the second part 802 and the housing 800 rather than the first part 801 and the housing 800. This makes a normally closed (NC) switch rather than a normally open (NO) switch.

Figure 20:
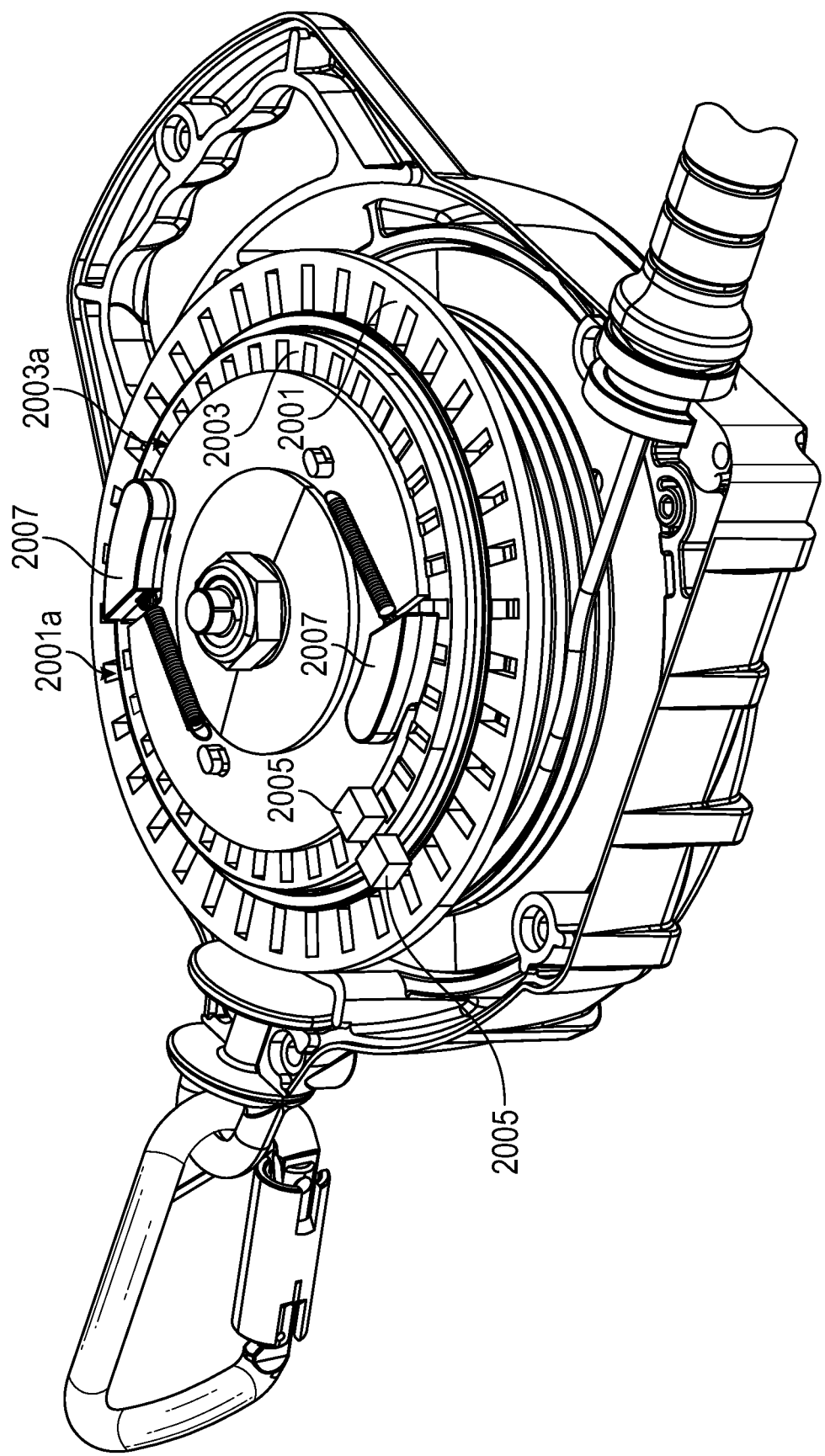
FIG. 20 is a perspective view of a self-retracting lifeline with a cover removed including an optical sensor.
Figure 21:
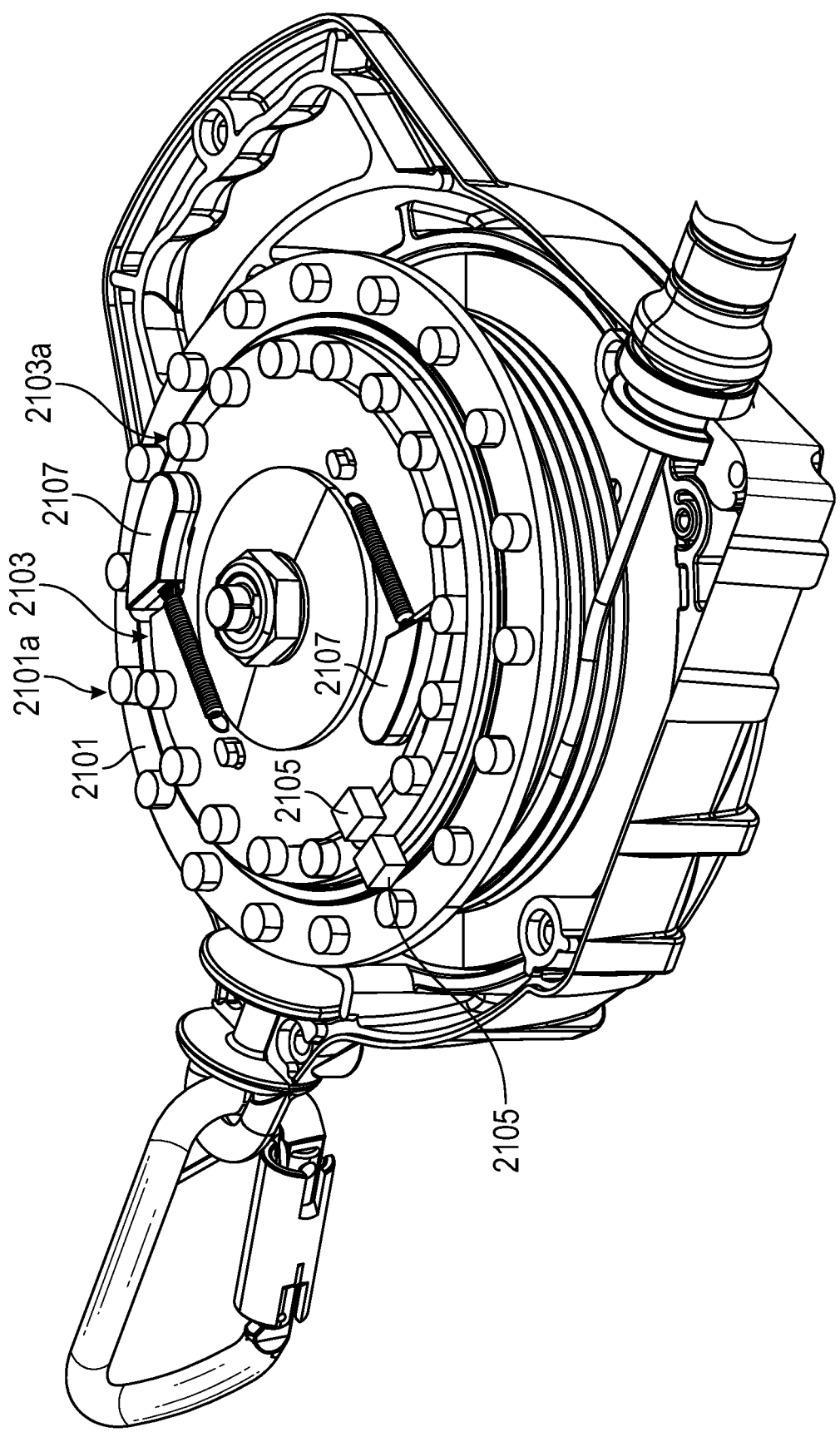
FIG. 21 is a perspective view of a self-retracting lifeline with a cover removed including a Hall Effect sensor.

A sensor could be used to sense relative motion between first and second portions of an elongate member. For a self-retracting lifeline, the first and second portions could be the drum and the housing, the drum and the pawl, or rotation of a friction plate. For a lanyard, the first and second portions could be the separating or elongating portions. The sensor could be optical, as shown in FIG. 20, or a Hall Effect sensor, as shown in FIG. 21.

The optical sensor detects a change of incident light through at least one aperture in a rotating member in proximity to the optical sensor. FIG. 20 shows two optical sensors 2005 positioned in proximity to apertures 2001a in the drum 2001 and apertures 2003a in the brake disc 2003, both of which rotate when the lifeline is extended or retracted. A change in incident light is detected as the sensors 2005 detect a change from solid material to one of many apertures 2001a and 2003a in the solid materials in the drum 2001 and in the brake disc 2003. During a fall, the pawls 2007 engage a stationary tooth on a ratchet (not shown) which prevents the brake disc 2003 from further rotation while the drum 2001 continues to rotate. The non-rotation of the brake disc 2003 is detected by no change to the incident light in comparison to the continued rotation of the drum 2001 which is detected by continued changes of incident light.

The Hall Effect sensor detects a threshold in a magnetic field created by at least one magnet attached to a rotating member in proximity to the Hall Effect sensor. FIG. 21 shows two Hall Effect sensors 2105 positioned in proximity to magnets 2101a attached to the drum 2101 and magnets 2103a attached to the brake disc 2103, both of which rotate when the lifeline is extended or retracted. A change in magnetic field is detected as the sensors 2105 detect a change from non-magnetic material the presence of one of many magnets. During a fall, the pawls 2107 engage a stationary tooth on a ratchet (not shown) which prevents the brake disc 2103 from further rotation while the drum 2101 continues to rotate. The non-rotation of the brake disc 2103 is detected by no change to magnetic field in comparison to the continued rotation of the drum 2101 which is detected by continued changes of magnetic field.

A force transducer could be positioned in line with operation of an elongate member to measure tension applied to the elongate member. The force transducer could also sense and communicate the magnitude of the impact. The tension on the self-retracting lifeline can be detected in order to compare to at least one threshold (e.g., the arresting force of the self-retracting lifeline). This can be accomplished by introducing a bending element (e.g., a beam) between the element used to suspend the self-retracting lifeline to the anchorage (e.g., the swivel) and the housing. The bending element can contain an electrically conductive element with a resistance that is proportional to the deflection of the conductive element (e.g., a strain gauge). The combination of the bending element and the electrically conductive element creates a transducer (e.g., a load cell) with an output proportional to the tension or compression applied to the self-retracting lifeline. This arrangement is also conceivable using an extension or compression element in place of the bending element.

Figure 22A:
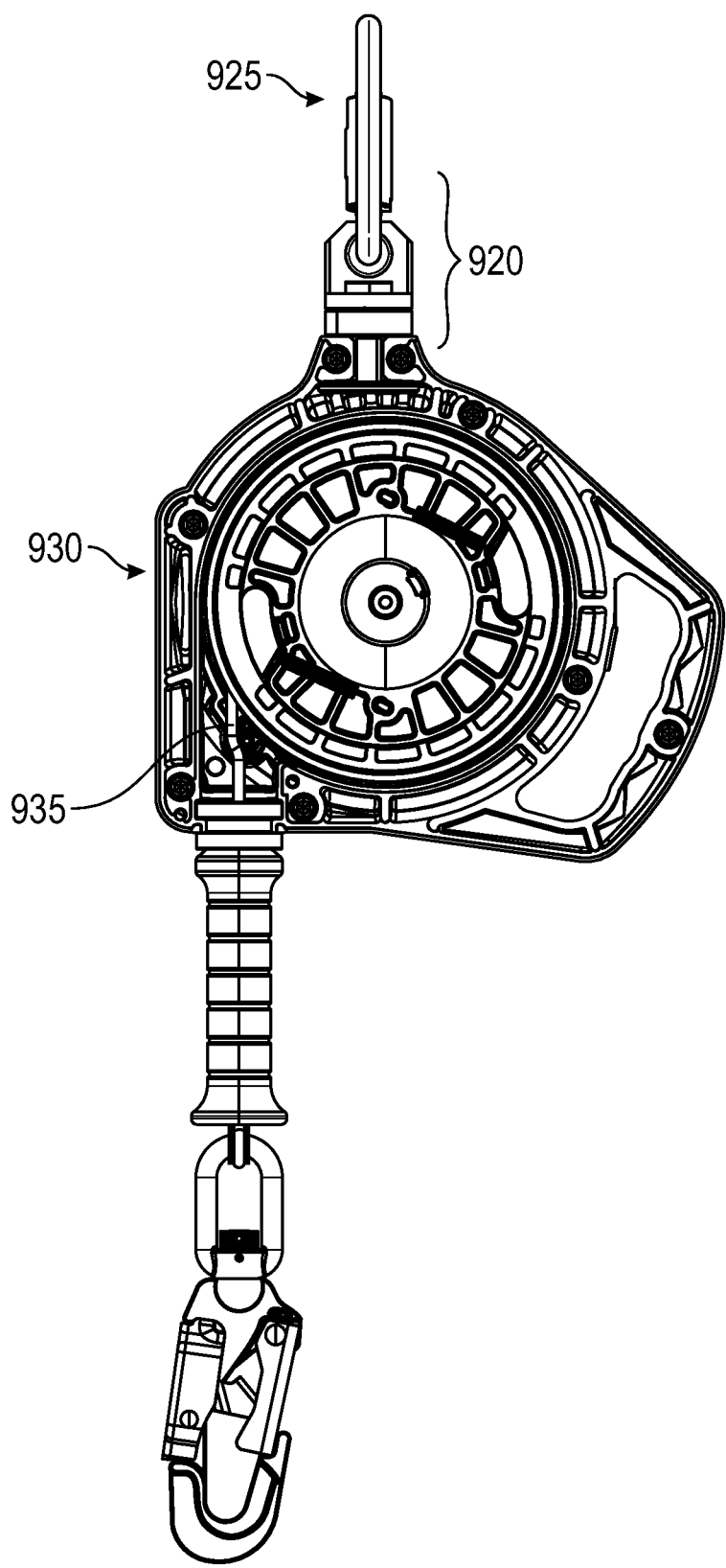
FIG. 22A is a front view of a self-retracting lifeline with a cover removed including a connector with a force transducer.
Figure 22B:
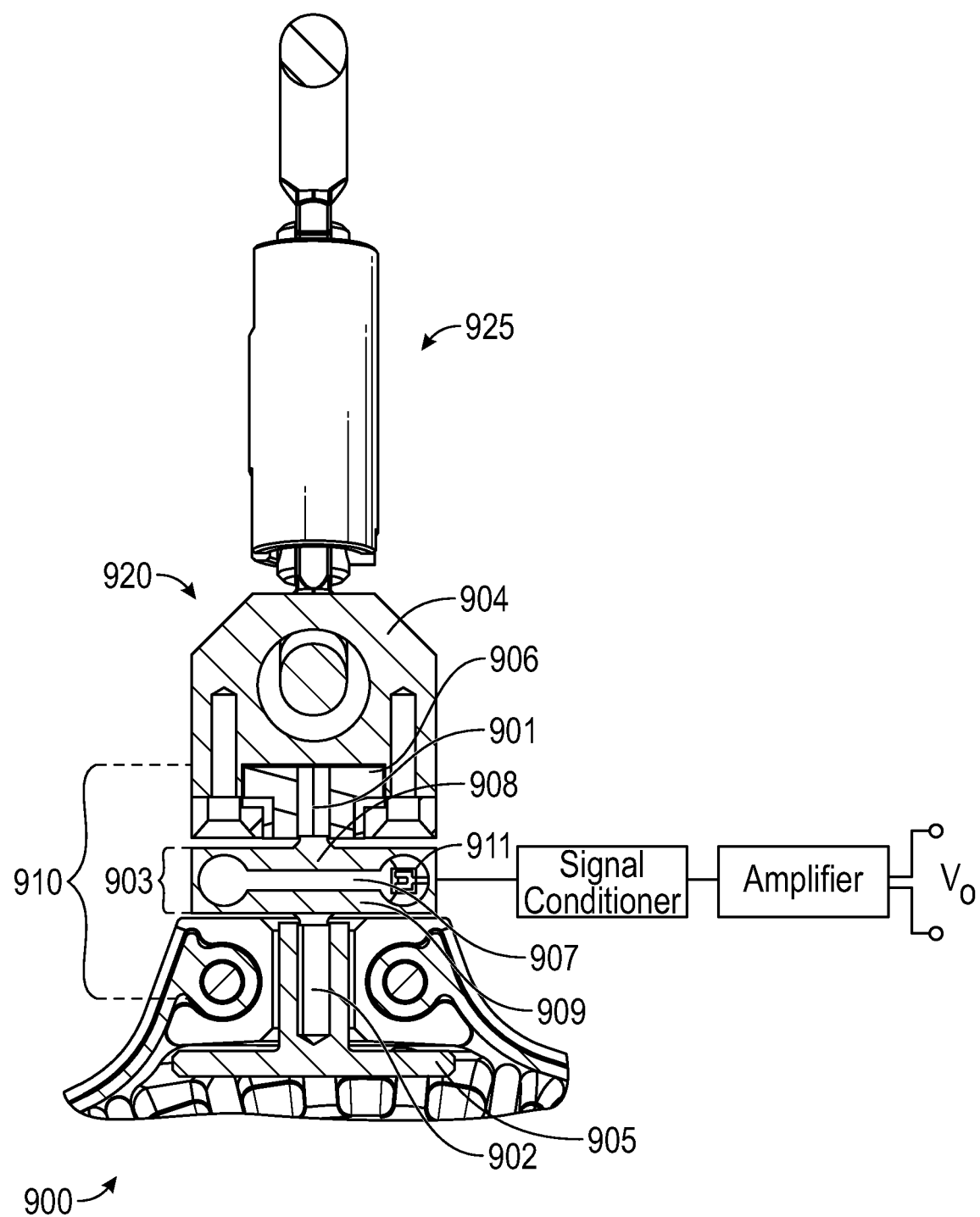
FIG. 22B is a cross-section view of the force transducer and a carabiner shown in FIG. 22A.

An example of this is shown in FIGS. 22A and 22B. An assembly 920 interconnects a self-retracting lifeline 930 to a carabiner or other suitable anchorage connector 925. The assembly 920 includes a force transducer 910 including a bending portion 903, a first end 901, and a second end 902. The bending portion 903 is comprised of a first part 908 and a second part 909 separated by a void 907 containing a strain gauge 911. The first end 901 of the force transducer 910 is connected to the first end 906 of a swivel member 904 using a threaded connection. The carabiner or other suitable anchorage connector 925 connects the swivel member 904 to an appropriate anchorage. The second end 902 of the force transducer 910 is connected to a second end 905 of a swivel member 904 using a threaded connection. The second end 905 of the swivel member 904 is rotatably connected to a housing 900. The tension applied to the elongate member 935 is transferred from the housing 900 to the first end 906 of the swivel member 904, with the bending portion 903 of the transducer 910 being subject to the tension. The tension causes deflection of the first part 908 of the bending portion 903 and the second part 909 of the bending portion 903 resulting in an increase in the material surrounding the void 907 which contains an electrically conductive element.

An impact indicator could include an alert indicator such as a light indicator, an audible indicator, and a haptic feedback indicator.

Usage Information

Current methods for determining when fall protection devices are in need of maintenance include manual inspection and time in use. Actual use metrics or conditions are not typically considered. It may also be desirable to monitor a worker's current situation.

The present invention could be used to record the total length of extension/retracting of a self-retracting lifeline, which could be measured by rotational sensors such as rotary encoders, optical sensors, and Hall Effect sensors.

The total cycles of components, reversal of rotational motion, could be recorded by measuring rotation (e.g., rotary encoders, optical sensors, and Hall Effect sensors) or a zero switch when a self-retracting lifeline has been fully retracted.

Ambient conditions (e.g., temperature, humidity, particulate content) could be monitored. Noise levels and air quality could also be monitored.

This type of information could be very useful for establishing use patterns and competitive benchmarking. Understanding how products are being used along with human performance could improve product development such as design and performance.

Understanding how products compare could improve productivity and safety compliance. The use pattern information could be used to assist in detecting unsafe conditions, unsafe work areas, falls, 100% tie-offs, users' work conditions, users' work intensity, reckless usages, and device usages.

Figure 23:
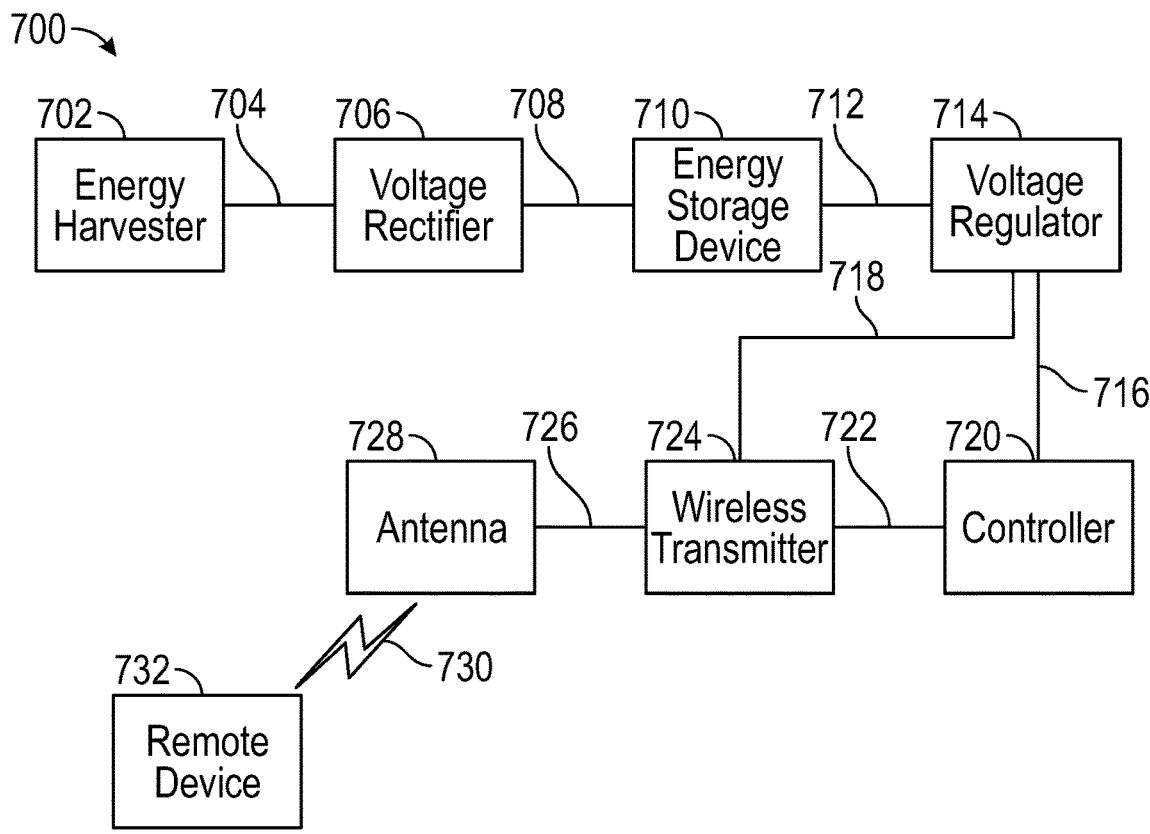
FIG. 23 is a block diagram illustrating a communication system.

FIG. 23 is a block diagram illustrating one example of a communication system 700 for use in a fall protection device. Communication system 700 includes an energy harvester 702, a voltage rectifier 706, an energy storage device 710, a voltage regulator 714, a controller 720, a wireless transmitter 724, an antenna 728, and a remote device 732. Energy harvester 702 is electrically coupled to voltage rectifier 706 through a power path 704. Voltage rectifier 706 is electrically coupled to energy storage device 710 through a power path 708. Energy storage device 710 is electrically coupled to voltage regulator 714 through a power path 712. Voltage regulator 714 is electrically coupled to controller 720 through a power path 716 and to wireless transmitter 724 through a power path 718. Controller 720 is communicatively coupled to wireless transmitter 724 through a communication path 722. Wireless transmitter 724 is electrically coupled to antenna 728 through a signal path 726.

Energy harvester 702 may include a coiled-rope generator as previously described and illustrated with reference to FIGS. 3A and 3B, a recoil spring and generator as previously described and illustrated with reference to FIGS. 5A and 5B, a motor having a gear train that provides a generator as previously described and illustrated with reference to FIG. 11, or a flywheel rotor with a one-way clutch as previously described and illustrated with reference to FIGS. 6, 6A, 6B, 6C, 6D, 6E, 7A, and 7B. Alternatively, energy harvester 702 may be integrated with an eddy-current braking assembly as previously described and illustrated with reference to FIGS. 8, 9, and 9A or planetary gears integrated with a self-retracting lifeline as previously described and illustrated with reference to FIGS. 10, 11, and 12. In any case, energy harvester 702 generates electrical power in response to movement of an elongate member (e.g., lanyard, self-retracting lifeline) or in response to an action from impact or a device (e.g., a spring) of a fall protection device and provides the electrical power to voltage rectifier 706.

Voltage rectifier 706 rectifies the voltage of the electrical power generated by energy harvester 702 to provide a voltage (e.g., 3-5 V) suitable for energy storage device 710. Voltage rectifier 706 provides the rectified voltage to energy storage device 710 to charge energy storage device 710. Energy storage device 710 may include a capacitor, a super capacitor, a battery, a rechargeable cell, or another suitable device for storing the generated electrical power. Energy storage device 710 provides electrical power to voltage regulator 714. Voltage regulator 714 regulates the voltage of the electrical power from energy storage device 710 to provide a regulated voltage to controller 720 and wireless transmitter 724 to power controller 720 and wireless transmitter 724.

Controller 720 includes a microcontroller, an Application Specific Integrated Circuit (ASIC), or another suitable circuit for monitoring the status of a fall protection device and generating a message in response to detecting a fall of a user. Controller 720 may receive sensor data from switches, encoders, or other suitable devices indicating a fall of a user. In response to detecting a fall of a user, controller 720 generates a message indicating the fall and transmits the message to wireless transmitter 724. Controller 720 may also activate a local indicator (e.g., visual indicator, audible indicator, haptic indicator) of the fall protection device in response to a fall of the user. In some embodiment, controller 720 is a microprocessor platform called Arduino having an integrated GSM cell phone chip. The microprocessor monitors a closed loop of conducted thread that can be incorporated into any of the aforementioned energy harvesters, such as for example by inclusion in an elongate member. Once the elongate member is pulled tight, it unfolds causing the conductive thread to break. Once the thread breaks, the microprocessor notices the loop is now "open", and it sends a text or data message containing information about the fall event.

Wireless transmitter 724 includes a Bluetooth Low Energy (BLE) radio transmitter, a Wi-Fi transmitter, or another suitable transmitter for wirelessly transmitting messages via antenna 728 to a remote device 732, as indicated by wireless signal 730. Wireless transmitter 724 transmits the message indicating the fall of a user to remote device 732. Remote device 732 may include a mobile device (e.g., cell phone), a control center, a wearable indicator (e.g., visual indicator, audible indicator, haptic device), or another suitable device to provide an indication that a fall has occurred in response to receiving the message from wireless transmitter 724.

In an alternate embodiment, shown in FIG. 24, electric currents or voltages generated by the energy harvester 702 in response to movement of an elongate member can be processed by a signal processor 729. Thus, the energy harvester 702 functions as a sensor as well, similar to how a rotary encoder functions. The signal processor 729 is powered by the energy storage device 710. The signals record angles and rotations of the elongate member that can be converted to length of extension/retracting of a lanyard or a self-retracting lifeline. With a clock in controller 720, speed and acceleration of extension/retracting of a lanyard or a self-retracting lifeline can be calculated from the signals. The total cycles of components, reversal of rotational motion, could be recorded by measuring rotation of the energy harvester 702 as well.

In some embodiments, wireless transmitter 724 is configured to include remote device 732 such that communications, for example a text message, can be transmitted from communication system 700 included a fall protection device. Once the text message is received, a user is able to click on the number and initiate a communication with the fallen worker wearing the fall protection device. Such communication system 700 may include a microphone and speaker to facilitate this communication. The communication system is configured to automatically answer the call, freeing the fallen person from the requirement to answer.

In some embodiments, communication system 700 can provide immediate and automatic alerts, including but not limited to the following:
  911/Emergency Response;
  Supervisor or general contractor;
  Site EHS/rescue team;
  Customer on-site dispatcher;
  Customer incident reporting system;
  Customer information collection system;
  Employer, anonymous or limited information collection system;
  Direct line of communication between rescue teams and rescue; and
  Reduced risk of medical complications due to excessive time awaiting rescue.

In some embodiments, communication system 700 can provide data collection of the following exemplary types of information, including but not limited to:
  Reporting into customer and/or employer system as opt-in anonymous usage statistics;
  Frequency of equipment use;
  Hours of use (motion sensing with 3 axis gyro/accelerometer);
  Inspection frequency and electronic documentation through an electronically connected safety management system; Users sharing information; and
  Device health & power status.

In some embodiments, communication system 700 can transmit information to an electronically connected safety management system, including but not limited to the following:
  User configurable information;
  Logging of inspections;
  Possible hours of use expirations; and
  Local and factory device preventative maintenance notifications.

In some embodiments, communication system 700 can provide anonymous data mining of a fall incident, including but not limited to the following:
  Sensor possibilities;
  Standard anonymous data collection;
  G-force;
  Equipment model(s)—harness, lanyard, fall arrest;
  Opt in per user:
  Time/Date;
  User information;
  Industry type;
  Response/rescue time;
  "Do not use" indication after fall;
  GPS location;
  Equipment serial number(s); and
  Other customer configurable data.

In some embodiments, communication system 700 can use the provided to perform various tasks, including but not limited to the following:
  Use details through an electronically connected safety management system;
  Incident investigations;
  Equipment reordering;
  Verification of correct equipment use;
  Verification of daily inspection;
  Task dependent equipment pairing requirements;
  User liability protection;
  User pairing, logging into equipment;
  Alerting when used—non-fall (accelerometer) without logging an inspection;
  Equipment retrieval—recover lost or missing equipment;
  Immediate contact potential for replacement;
  Potential for automatic reorder through an electronically connected safety management system;
  Order recommendation based on hours used;
  Usage statistics, such as G-Force, time/date, customer, frequency, inspections, geographic (GPS);
  Environmental condition information;
  Life-cycle usage statistics;
  User consistency/user equipment sharing; and
  Verification of appropriate preventative maintenance conducted by users.

The above specification, examples, and data provide a complete description of the manufacture and use of the composition of embodiments of the invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the invention. Therefore, it is manifestly intended that this invention be limited only by the claims and the equivalents thereof.

The invention claimed is:

1. A fall protection device comprising:
an elongate member for interconnecting a user and a support structure;
an energy harvester to generate electrical power in response to elongation of the elongate member during a fall; and
a circuit powered by the generated electrical power,
wherein the elongate member is a lifeline at least partially wound about a rotatable member, the movement of the elongate member being at least one of pulling and retracting of the lifeline relative to the rotatable member,
wherein the lifeline and the rotatable member are part of a self-retracting lifeline, the self-retracting lifeline comprises a mechanical retracting lifeline lanyard, and wherein the energy harvester comprises a flywheel rotor with a one-way clutch to store kinetic energy in response to pulling of the lifeline and to generate electrical power when the flywheel rotor is rotating.

2. The device of claim 1, wherein the elongate member is a lanyard and the energy harvester comprises a coiled-rope generator having a coiled-rope, the coiled-rope generator rotated in response to the coiled-rope uncoiling in response to the movement of the elongate member.

3. The device of claim 1, wherein the elongate member is a lanyard and the energy harvester comprises a recoil spring and a generator that is rotated by the recoil spring in response to the movement of the elongate member.

4. The device of claim 3, wherein the energy harvester comprises a break away latch that maintains the recoil spring in a wound state and releases stored energy of the recoil spring in response to a fall of the user.

5. The device of claim 1, wherein the energy harvester comprises an energy storage device selected from the group consisting of a capacitor, a super capacitor, a battery, and a rechargeable cell to store the generated electrical power.

6. The device of claim 5, wherein the energy harvester comprises a voltage regulator coupled to the energy storage device to provide regulated electrical power to the circuit.

7. The device of claim 1, wherein the circuit comprises a wireless transmitter to transmit a message in response to a fall of the user.

8. The device of claim 7, wherein the wireless transmitter comprises a Bluetooth transmitter.

9. The device of claim 7, wherein the wireless transmitter is to transmit the message to a cell phone or a control center in response to a fall of the user.

10. The device of claim 1, wherein the elongate member is an energy absorbing lanyard having a first portion and a second portion that at least partially separate in response to a fall of the user, the movement of the elongate member being separation of the first and second portions.

11. The device of claim 1, wherein the lifeline and the rotatable member are part of a self-retracting lifeline, the energy harvester is integrated with the self-retracting lifeline and comprises a motor having a gear train that provides both a generator to generate electrical power and an encoder to digitize the pulling and retracting of the lifeline.

12. The device of claim 1, wherein the lifeline and the rotatable member are part of a self-retracting lifeline, the self-retracting lifeline comprises an eddy-current braking assembly, and wherein the energy harvester is integrated with the eddy-current braking assembly and a portion of the eddy-currents are converted to generate electrical power.

13. The device of claim 1, wherein the lifeline and the rotatable member are part of a self-retracting lifeline, the energy harvester comprises planetary gears, at least one rotor and at least one stator, which are integrated with the self-retracting lifeline such that the at least one rotor rotates in response to pulling and retracting of the lifeline at a faster speed than the rotatable member in the opposite direction of the stator to generate electrical power.

14. The device of claim 1, wherein the lifeline and the rotatable member are part of a self-retracting lifeline, further comprising:
 a spiral coil spring placing a biasing force on the rotatable member; and
 a generator connected to the spiral coil spring, wherein movement of the spiral coil spring generates electricity.

15. A fall protection device comprising:
 an elongate member for interconnecting a user and a support structure;
 a generator to generate electrical power in response to potential energy of the fall protection device being converted into kinetic energy during a fall;
 an energy storage capacitor to store the generated electrical power;
 a controller powered by the energy storage capacitor, the controller to generate a message in response to an action from use of the fall protection device; and
 a wireless transmitter powered by the energy storage capacitor, the wireless transmitter to transmit the message
 wherein the elongate member is a lifeline at least partially wound about a rotatable member, the movement of the elongate member being at least one of pulling and retracting of the lifeline relative to the rotatable member,
 wherein the lifeline and the rotatable member are part of a self-retracting lifeline, the self-retracting lifeline comprises a mechanical retracting lifeline lanyard, and wherein the energy harvester comprises a flywheel rotor with a one-way clutch to store kinetic energy in response to pulling of the lifeline and to generate electrical power when the flywheel rotor is rotating.

16. A fall protection device comprising:
 an elongate member for interconnecting a user and a support structure;
 an impact indicator connected to the elongate member;
 a controller connected to at least one of the elongate member and the impact indicator to generate a message in response to an impact;
 an energy harvester to generate electrical power in response to movement of the elongate member; and
 a transmitter connected to the controller to transmit the message
 wherein the elongate member is a lifeline at least partially wound about a rotatable member, the movement of the elongate member being at least one of pulling and retracting of the lifeline relative to the rotatable member,
 wherein the lifeline and the rotatable member are part of a self-retracting lifeline, the self-retracting lifeline comprises a mechanical retracting lifeline lanyard, and wherein the energy harvester comprises a flywheel rotor with a one-way clutch to store kinetic energy in response to pulling of the lifeline and to generate electrical power when the flywheel rotor is rotating.

17. A fall protection device comprising:
 an elongate member for interconnecting a user and a support structure;
 a sensor connected to the elongate member;
 an energy harvester to generate electrical power in response to movement of the elongate member; and
 a controller connected to the sensor to generate a message in response to movement of the elongate member
 wherein the elongate member is a lifeline at least partially wound about a rotatable member, the movement of the elongate member being at least one of pulling and retracting of the lifeline relative to the rotatable member, wherein the lifeline and the rotatable member are part of a self-retracting lifeline, the self-retracting lifeline comprises a mechanical retracting lifeline lanyard, and wherein the energy harvester comprises a flywheel rotor with a one-way clutch to store kinetic energy in response to pulling of the lifeline and to generate electrical power when the flywheel rotor is rotating.

\* \* \* \* \*